(12) United States Patent  (10) Patent No.: US 12,294,814 B2
Kaniwa et al.  (45) Date of Patent: May 6, 2025

(54) WATCHING MONITORING DEVICE AND WATCHING MONITORING METHOD

(71) Applicant: MAXELL, Ltd., Kyoto (JP)

(72) Inventors: Koji Kaniwa, Kyoto (JP); Masuo Oku, Kyoto (JP)

(73) Assignee: MAXELL, Ltd., Kyoto (JP)

( * ) Notice: Subject to any disclaimer, the term of this patent is extended or adjusted under 35 U.S.C. 154(b) by 0 days.

(21) Appl. No.: 18/008,919

(22) PCT Filed: Jun. 10, 2020

(86) PCT No.: PCT/JP2020/022794
§ 371 (c)(1),
(2) Date: Dec. 7, 2022

(87) PCT Pub. No.: WO2021/250805
PCT Pub. Date: Dec. 16, 2021

(65) Prior Publication Data
US 2023/0300296 A1    Sep. 21, 2023

(51) Int. Cl.
*H04N 7/18*    (2006.01)
*G06T 11/00*    (2006.01)
(Continued)

(52) U.S. Cl.
CPC ........... *H04N 7/181* (2013.01); *G06T 11/001* (2013.01); *G06V 20/52* (2022.01); *G06V 40/172* (2022.01)

(58) Field of Classification Search
CPC ...... H04N 7/181; G06V 20/52; G06V 40/172; G06T 11/001
(Continued)

(56) References Cited

U.S. PATENT DOCUMENTS

| 7,668,345 B2 * | 2/2010 | Kiyohara | G06V 20/52 |
| | | | 382/115 |
| 10,592,730 B2 * | 3/2020 | Oguchi | H04N 7/181 |
| | (Continued) | | |

FOREIGN PATENT DOCUMENTS

| JP | 2006-287287 A | 10/2006 |
| JP | 2009-225398 A | 10/2009 |
| | (Continued) | |

OTHER PUBLICATIONS

International Search Report issued in corresponding International Patent Application No. PCT/JP2020/022794, dated Sep. 1, 2020, with English translation.

*Primary Examiner* — Boubacar Abdou Tchoussou
*Assistant Examiner* — Asmamaw G Tarko
(74) *Attorney, Agent, or Firm* — Rimon P.C.

(57) ABSTRACT

A watching monitoring apparatus includes a monitoring camera and a home server, and monitors a watching space in which a watched person exists. The monitoring camera images the watching space. The home server includes a person detector that detects a person from a captured image, and classifies the detected person into a face part and a body part, a processing-drawing part that performs a processing-drawing process with respect to the body part except for the face part, an image synthesizer that creates a synthesized image of an image subjected to the processing-drawing process and the captured image, and a network part through which the synthesized image is transmitted to a display terminal of a watching person. When the detected person has not been registered in face information registration data in which face information of the watched person is registered, the processing-drawing process is not performed with respect to the person.

15 Claims, 21 Drawing Sheets

(51) Int. Cl.
*G06V 20/52* (2022.01)
*G06V 40/16* (2022.01)

(58) Field of Classification Search
USPC .......................................... 348/153
See application file for complete search history.

(56) References Cited

U.S. PATENT DOCUMENTS

| | | | |
|---|---|---|---|
| 10,796,480 B2* | 10/2020 | Chen .................. | G06V 40/166 |
| 2006/0222213 A1* | 10/2006 | Kiyohara ................ | G07C 9/00 |
| | | | 382/103 |
| 2015/0213604 A1* | 7/2015 | Li .......................... | G06T 13/80 |
| | | | 345/473 |
| 2015/0339519 A1* | 11/2015 | Ueta ...................... | G06V 20/53 |
| | | | 382/103 |
| 2016/0284123 A1* | 9/2016 | Hare ........................ | G06T 7/55 |
| 2017/0236298 A1* | 8/2017 | Vetter .................... | G06V 40/10 |
| | | | 348/77 |
| 2019/0188488 A1* | 6/2019 | Ito ........................... | G06T 7/536 |
| 2019/0278976 A1* | 9/2019 | Khadloya ........ | G08B 13/19656 |
| 2021/0166005 A1* | 6/2021 | Kimura .................. | G06V 20/52 |
| 2023/0091394 A1* | 3/2023 | Yi ......................... | G05B 15/02 |
| | | | 340/5.61 |

FOREIGN PATENT DOCUMENTS

| | | | |
|---|---|---|---|
| JP | 2012212967 A | * | 11/2012 |
| JP | 2014197263 A | * | 10/2014 |
| JP | 2017037385 A | * | 2/2017 |
| JP | 2017188771 A | * | 10/2017 |
| JP | 2018-018456 A | | 2/2018 |
| WO | 2018/092378 A1 | | 5/2018 |

\* cited by examiner

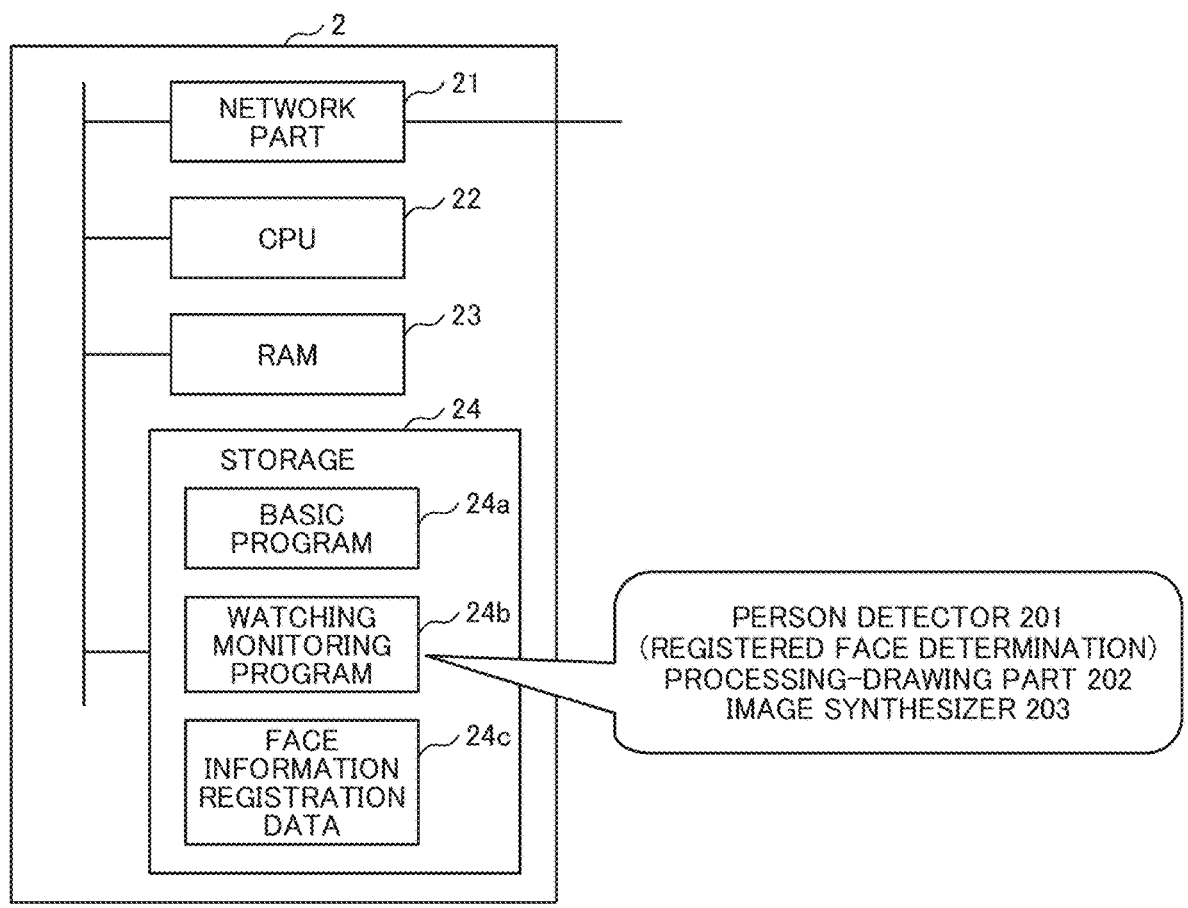
F I G. 7

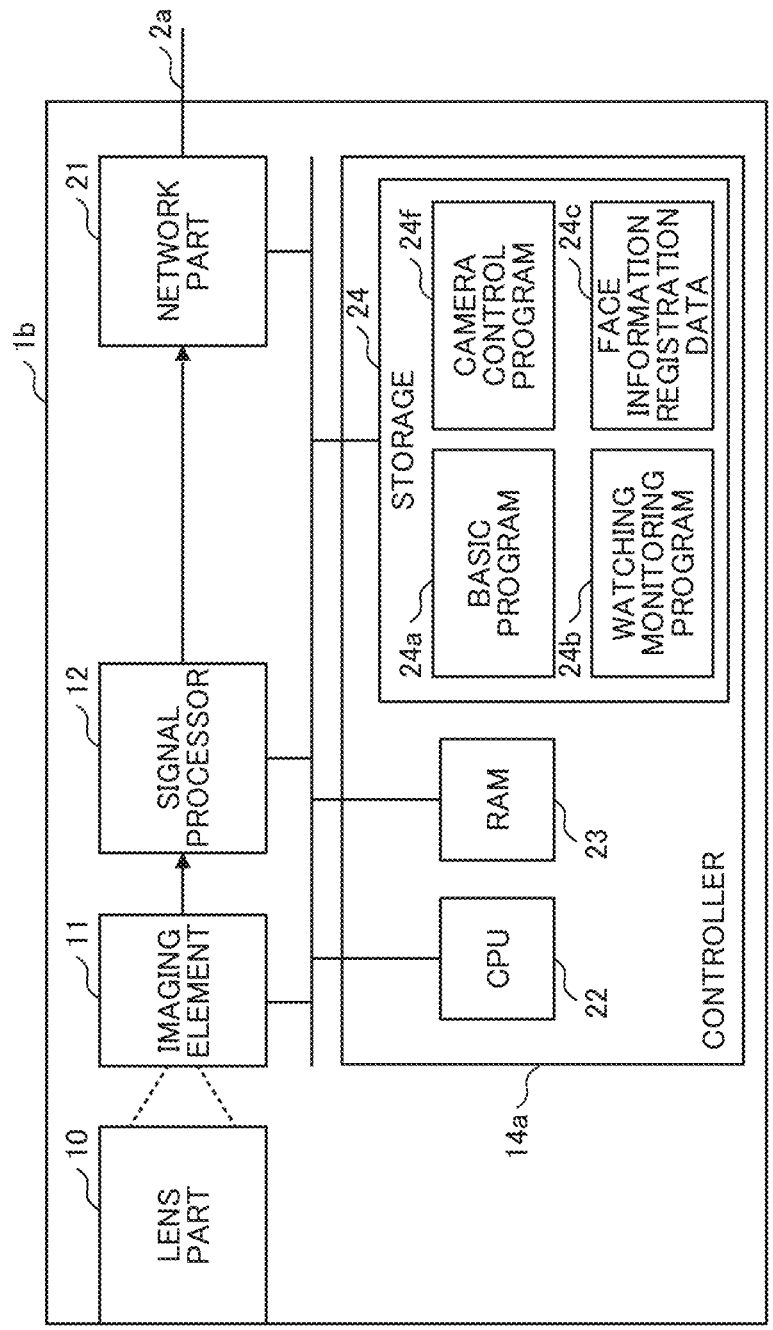
F I G. 1 3 A

WATCHING MONITORING DEVICE AND WATCHING MONITORING METHOD

CROSS-REFERENCE OF RELATED APPLICATION

This application is the U.S. National Phase under 35 U.S.C. § 371 of International Patent Application No. PCT/JP2020/022794, filed on Jun. 10, 2020, the entire disclosure of which Application is incorporated by reference herein.

TECHNICAL FIELD

The present invention relates to a watching monitoring apparatus and a watching monitoring method for watching a person with a monitoring camera, and relates to a watching monitoring technology for making grasping of a situation of a watching target person (watched person) and privacy protection be compatible with each other.

BACKGROUND ART

In the watching monitoring apparatus, abstraction such as mosaic processing and frosted glass processing is performed with respect to the entirety of an image captured by a monitoring camera or a body part including a face of a person for privacy protection of the watched person, but there is a problem that it is difficult to grasp the situation of the watched person.

With regard to this, Patent Document 1 discloses a watching monitoring system that is provided with a sensor configured to detect an action of a person, performs blur processing with respect to captured image data and outputs the resultant image data in a case where an action of the person is detected by the sensor, and outputs the captured image data in a case where an action of the person is not detected for predetermined time.

CITATION LIST

Patent Document

Patent Document 1: JP 2018-18456 A

SUMMARY OF THE INVENTION

Problems to be Solved by the Invention

In a method disclosed in Patent Document 1, even though privacy protection is considered, since blur processing is performed when a person is moving, it is difficult to accurately grasp a situation of the person. Particularly, since the blur processing is also performed with respect to a face of the person, it is difficult to determine whether or not the person is a watching target person. It is not necessary to hide the face of the person of the watching target person, and rather, it is possible to know a health condition of the person and the like by looking at the face. In addition, in Patent Document 1, since image output is controlled after detecting presence or absence of an action of the person with a sensor, there is a problem that predetermined time is taken up to image output, and it is difficult to instantly grasp a situation of a watched person when a person who performs watching (a watching person) initiates watching.

The invention has been made in consideration of such circumstances, and an object thereof is to provide a watching monitoring apparatus and a watching monitoring method in which grasping a situation of a watched person and privacy protection are compatible with each other and which are capable of instantly grasping a situation of the watched person when a watching person initiates or tries to resume watching.

Solutions to Problems

To solve the above-described problem, a watching monitoring apparatus of the invention includes: a monitoring camera configured to image a watching space in which a watched person exists; a person detector configured to detect a person from a captured image acquired by the monitoring camera, and to classify the detected person into a face part and a body part; a processing-drawing part configured to perform a processing-drawing process with respect to the body part except for the face part classified by the person detector; an image synthesizer configured to create a synthesized image of an image subjected to the processing-drawing process and the captured image; and a network part configured to transmit the synthesized image to a display terminal of a watching person.

In addition, a watching monitoring method of the invention includes: an image acquisition step of acquiring a captured image of a watching space in which a watched person exists; a person detection step of detecting a person from the captured image and classifying the detected person into a face part and a body part; a processing-drawing step of performing processing-drawing process with respect to the body portion except for the face part classified in the person detection step; an image synthesis step of creating a synthesized image of an image subjected to the processing-drawing process and the captured image; and a transmission step of transmitting the synthesized image to a display terminal of a watching person.

Effects of the Invention

According to the invention, grasping of a situation of a watched person and privacy protection are compatible with each other, and it is possible to instantly grasp a situation of the watched person when a watching person initiates or tries to resume watching.

BRIEF DESCRIPTION OF THE DRAWINGS

FIG. 7 is a block diagram illustrating a configuration example of the home server.

FIG. 13A is a block diagram illustrating a configuration example of a server-integrated monitoring camera relating to Example 4.

MODE FOR CARRYING OUT THE INVENTION

Hereinafter, embodiments of the invention will be described with reference to the accompanying drawings.

Example 1

In Example 1, description will be given of a basic configuration and a basic operation (person detection, processing-drawing process) of a watching monitoring apparatus.

Figure 1:
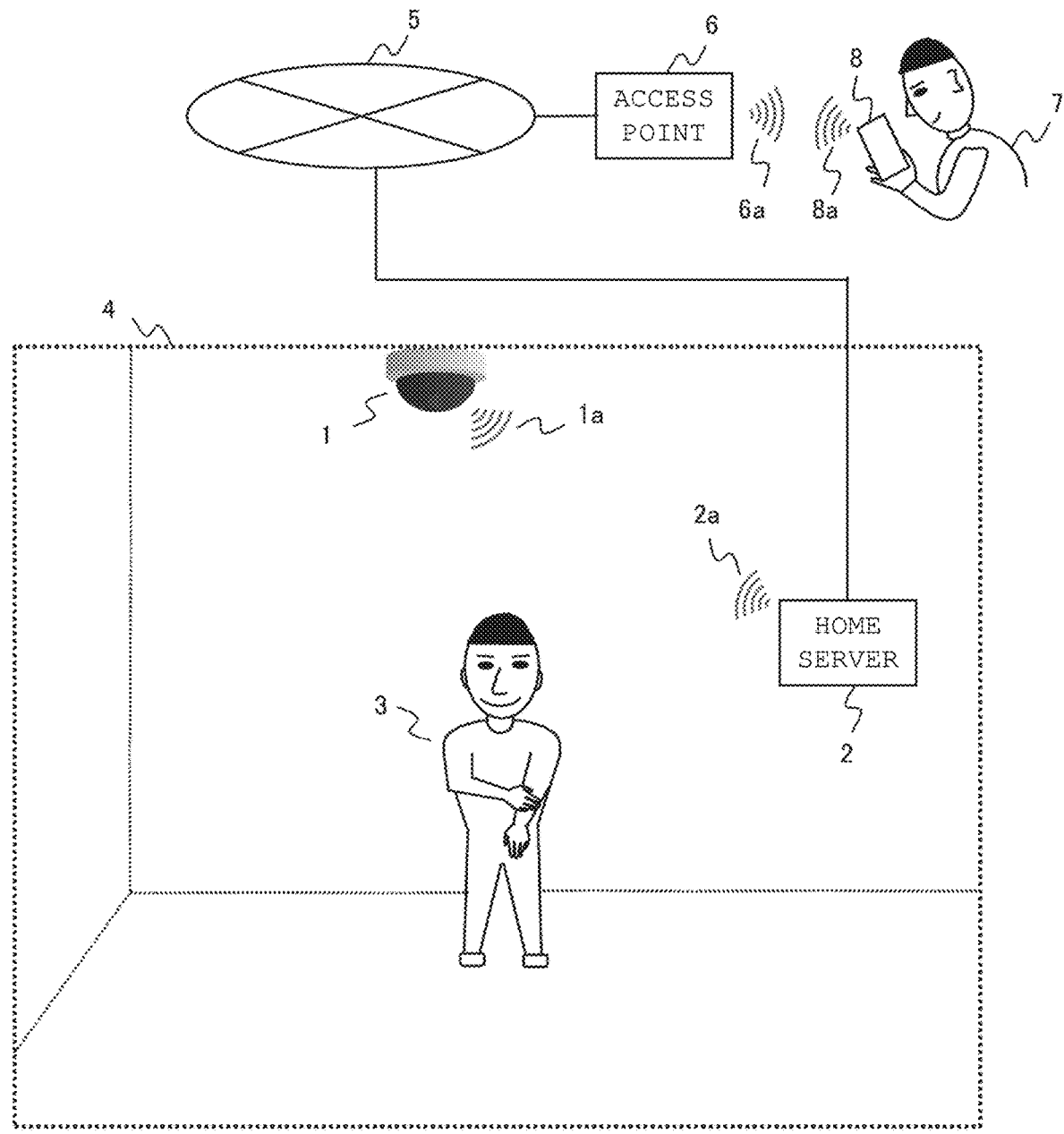
FIG. 1 is a view illustrating an overall configuration of a monitoring system relating to Example 1.

FIG. 1 is a view illustrating an overall configuration of a monitoring system relating to Example 1. The monitoring system includes a monitoring camera 1 and a home server 2 as a watching monitoring apparatus, and monitors a watching space 4 in which a watched person 3 exists. The home server 2 is connected to a display terminal 8 carried by a watching person 7 through a network 5 and an access point 6. The monitoring camera 1 images the watching space 4. Image data captured by the monitoring camera 1 is transmitted to the home server 2 by communication signals 1a and 2a. In the home server 2, a processing-drawing process to be described later is performed with respect to the image data, and the resultant image data is transmitted to the display terminal 8 by communication signals 6a and 8a through the network 5 and the access point 6. In the display terminal 8, the image subjected to the processing-drawing process is displayed on the display terminal 8, and thus the watching person 7 can grasp a situation of the watched person 3 by visually recognizing the image.

Figure 2A:
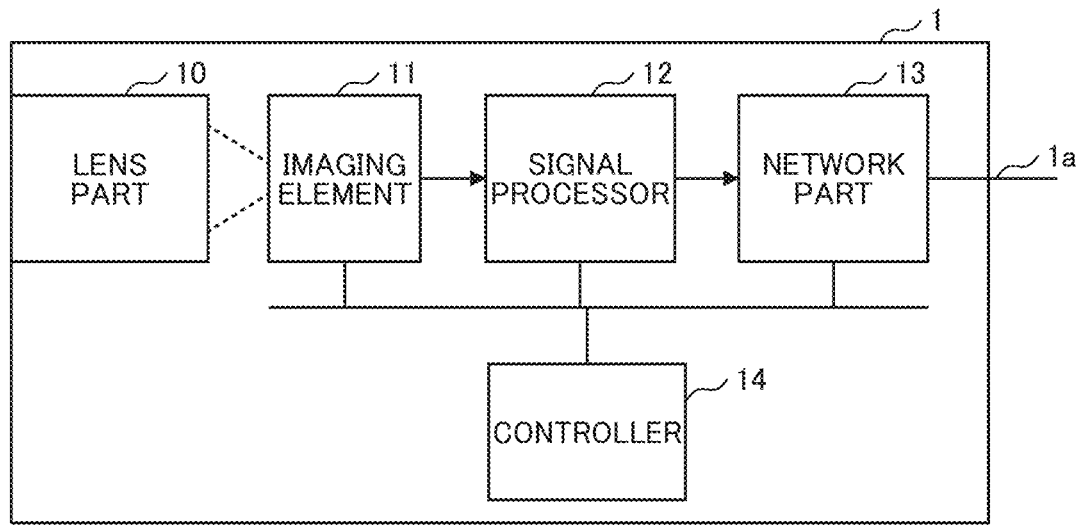
FIG. 2A is a block diagram illustrating a configuration example of a monitoring camera.
Figure 2B:
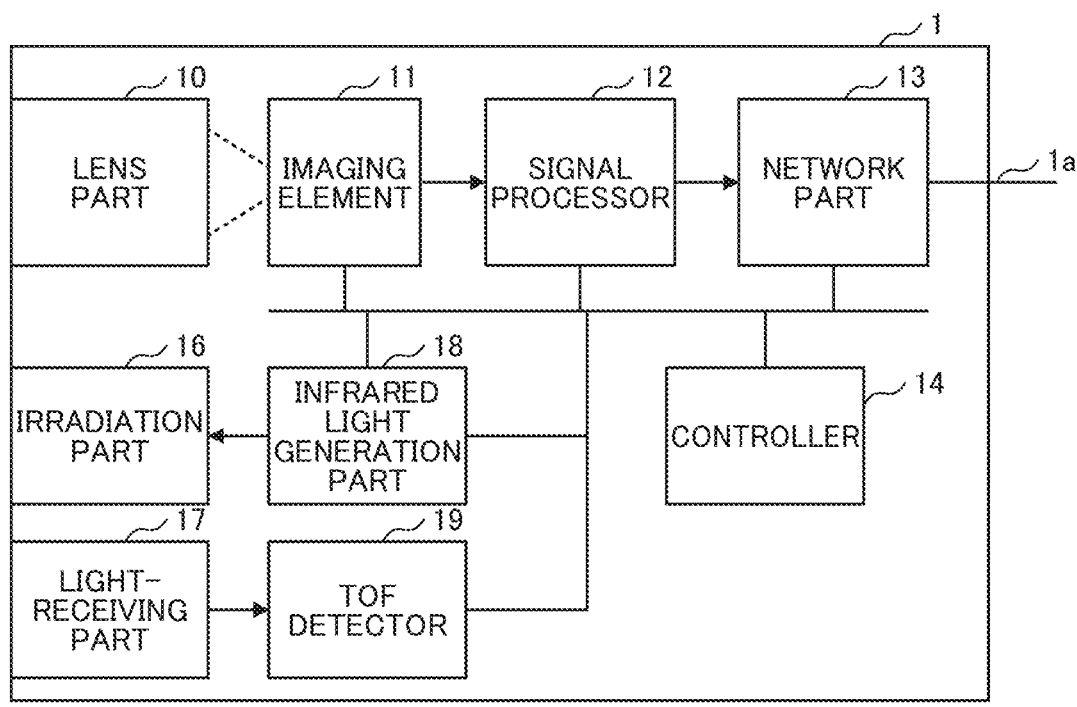
FIG. 2B is a block diagram illustrating a configuration example of the monitoring camera (provided with a distance measuring function).

FIG. 2A and FIG. 2B are block diagrams illustrating two configuration examples of the monitoring camera 1.

The monitoring camera 1 illustrated in FIG. 2A corresponds to a case of a configuration having only an imaging function and includes a lens part 10, an imaging element 11, a signal processor 12, a network part 13, and a controller 14.

An imaging target condensed by the lens part 10 is imaged on the imaging element 11, is converted into image data by the signal processor 12, and is transmitted from the network part 13 toward the home server 2 by the communication signal 1a. The controller 14 controls the entirety of the operations.

The monitoring camera 1 illustrated in FIG. 2B has a distance measuring function in addition to the imaging function in FIG. 2A. Accordingly, an irradiation part 16, a light-receiving part 17, an infrared light generation part 18, and a time of flight (TOF) detector 19 are additionally provided. Infrared light generated by the infrared light generation part 18 is emitted from the irradiation part 16 to the outside (the watching space 4). The light-receiving part 17 receives reflected light when the emitted infrared light is reflected from an imaging target (the watched person 3). The TOF detector 19 measures a distance from the monitoring camera to the imaging target from a time difference between the emitted light and the reflected light, and obtains distance measurement data. Note that, means for realizing the distance measuring function may be a method other than TOF such as a method in which infrared light having a specific two-dimensional pattern is emitted, and a distance is calculated from a deformation of the two-dimensional pattern of the received infrared light, and a method in which laser light is used instead of the infrared light.

Figure 3:
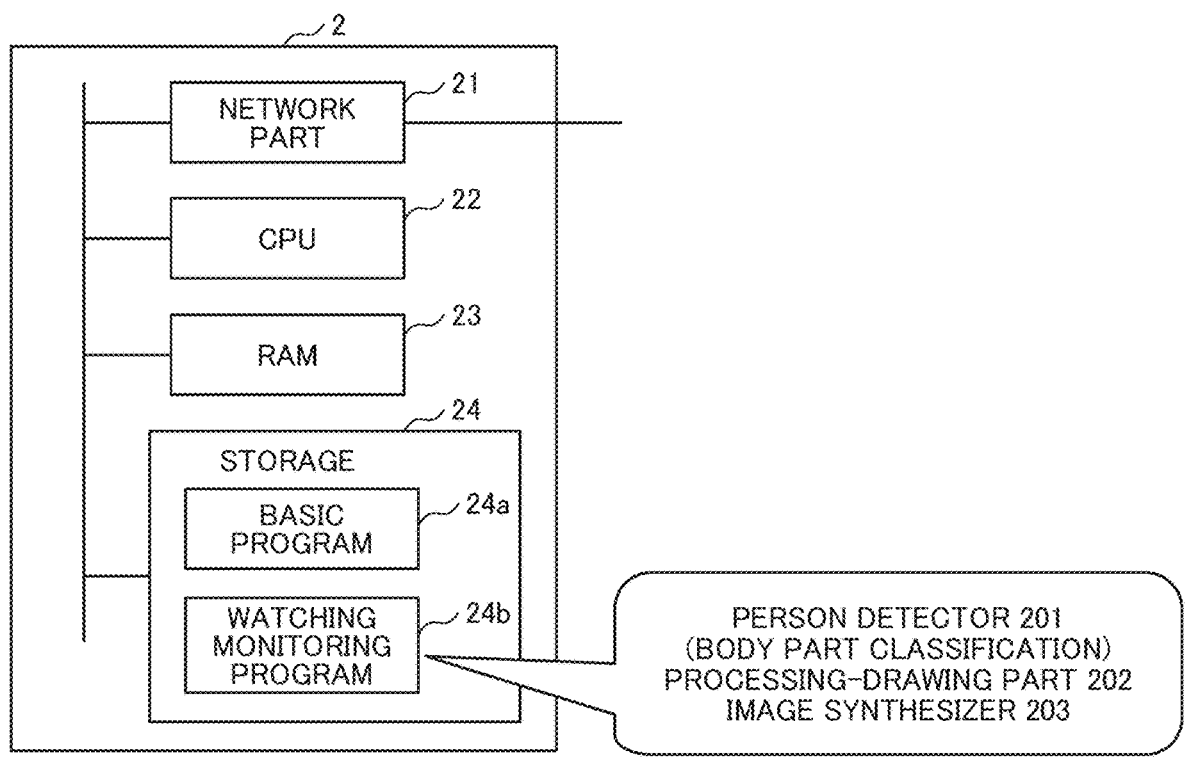
FIG. 3 is a block diagram illustrating a configuration example of a home server.

FIG. 3 is a block diagram illustrating a configuration example of the home server 2. The home server 2 includes a network part 21, a CPU 22, a RAM 23, and a storage 24. The storage 24 stores a basic program 24a and a watching monitoring program 24b as a processing program or data. The processing program or data is stored in the RAM 23 and is executed by the CPU 22 to perform various kinds of control of a watching monitoring operation. A configuration method of the storage 24 is not limited, and the storage 24 may be configured by a semiconductor such as a flash ROM, a combination with a hard disk, or the like. The network part 21 receives captured image data from the monitoring camera 1, and transmits image data for display to the display terminal 8.

The storage 24 stores the watching monitoring program 24b, and the CPU 22 executes the watching monitoring program 24b to realize functional parts such as a person detector 201, a processing-drawing part 202, an image synthesizer 203, and the like. The person detector 201 detects a person (watched person) from an image captured by the camera, and performs a process of classifying a detected person region into body parts such as a face and a body. In addition, the processing-drawing part 202 performs a coloring process with respect to respective body parts of the person, or a gradation process in correspondence with a distance up to each part of the person so as to protect privacy of the watched person. The image synthesizer 203 synthesizes the captured image and the image subjected to the processing-drawing process, and an image after synthesis is transmitted to the display terminal 8 of the watching person 7 as a monitoring image through the network part 21. In this manner, the home server 2 of this example has a function of processing image processing with respect to the image captured by the camera and providing to the resultant processed image to the watching person, and can be referred to as "management apparatus".

Figure 4A:
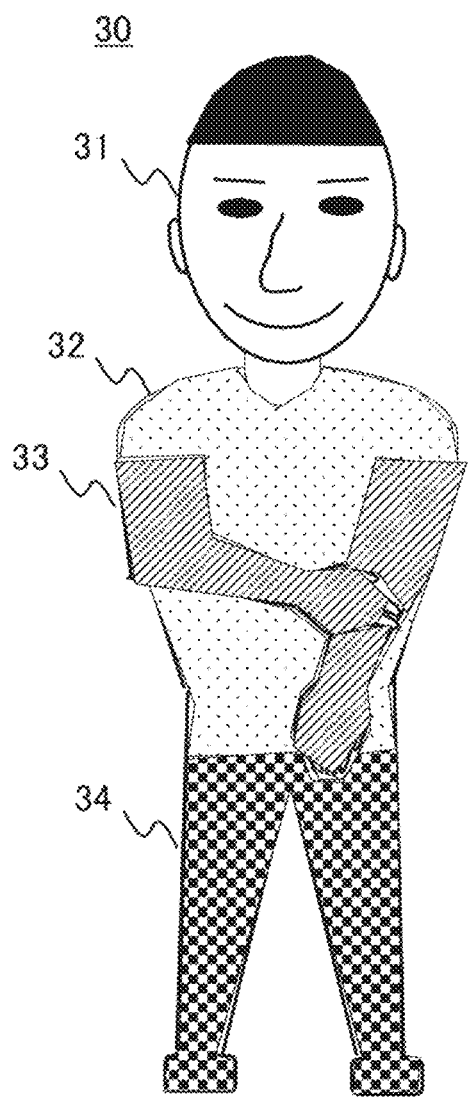
FIG. 4A is a view illustrating an example of a processing-drawing process (a coloring process) by processing-drawing part.
Figure 4B:
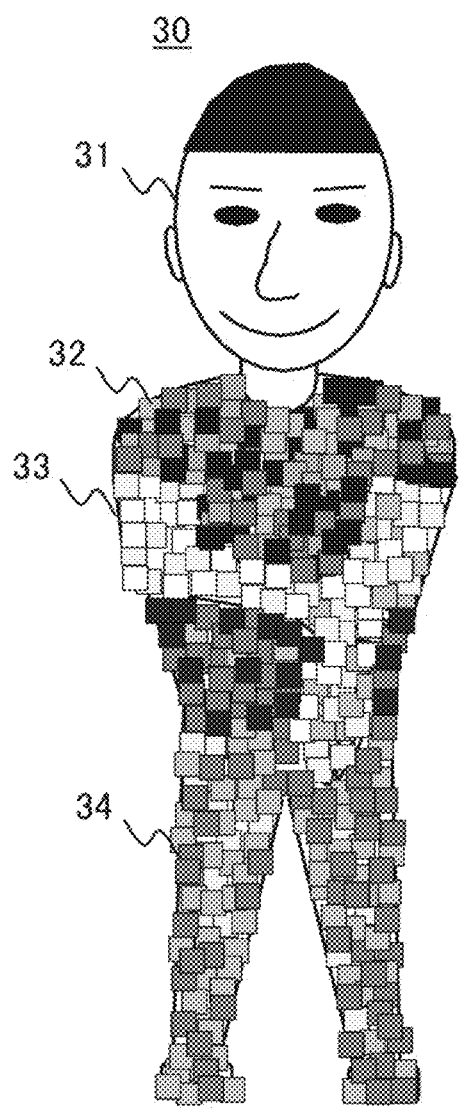
FIG. 4B is a view illustrating an example of a processing-drawing process (a gradation process) by the processing-drawing part.

FIG. 4A and FIG. 4B are views illustrating an example of the processing-drawing process by the processing-drawing part 202.

FIG. 4A is an example in which a coloring process is performed with respect to body parts of a person. When detecting a person 30 from the captured image, the person detector 201 classifies the person 30 into body parts such as a face 31, a body 32, a hand 33, and a foot 34. Then, the processing-drawing part 202 applies different colors to the parts 32, 33, and 34 other than the face 31 (here, a color difference is expressed by a pattern).

FIG. 4B is an example in which a gradation process is performed with respect to body parts in correspondence with distance measurement data in a case where the monitoring camera 1 has the configuration (provided with the distance measuring function) in FIG. 2B. The gradation process is a process which is performed with respect to parts other than the face 31 in a pixel unit or in a unit of a plurality of pixels, and in which a pixel on a close side is made to be bright and a pixel on a distant side is made to be dark. The gradation process is performed after the coloring process in FIG. 4A in combination with the coloring process, but the gradation process may be performed alone without performing the coloring process.

The monitoring image subjected to the processing-drawing process is synthesized with the captured image, and the resultant synthesized image is transmitted to the display terminal 8 and is displayed thereon. As a result, although the watching person 7 cannot recognize details of the body parts of the person 30, but the watching person 7 can easily understand movement of the body parts. Particularly, due to the gradation process, a front and rear positional relationship can be expressed with gradation, and grasping of movement becomes easy.

The processing-drawing process of this example is not performed with respect to the face part of the person 30. Therefore, grasping a situation by facial expression of the face can be performed without any problem. In addition, drawing is performed for every body part, and thus there is an effect capable of easily grasping a behavior the person.

Note that, in a case where a plurality of persons (watched persons) exist, a color applied to each watched person may be set to be different in order for the watched person to be easily distinguished. In addition, in accordance with a direction of the face of the watched person, the face of the watched person may not be detected within the image captured by the monitoring camera, and only the head may be detected. Even in this case, the above-described processes may be performed with priority given to privacy protection of the watched person.

Figure 5:
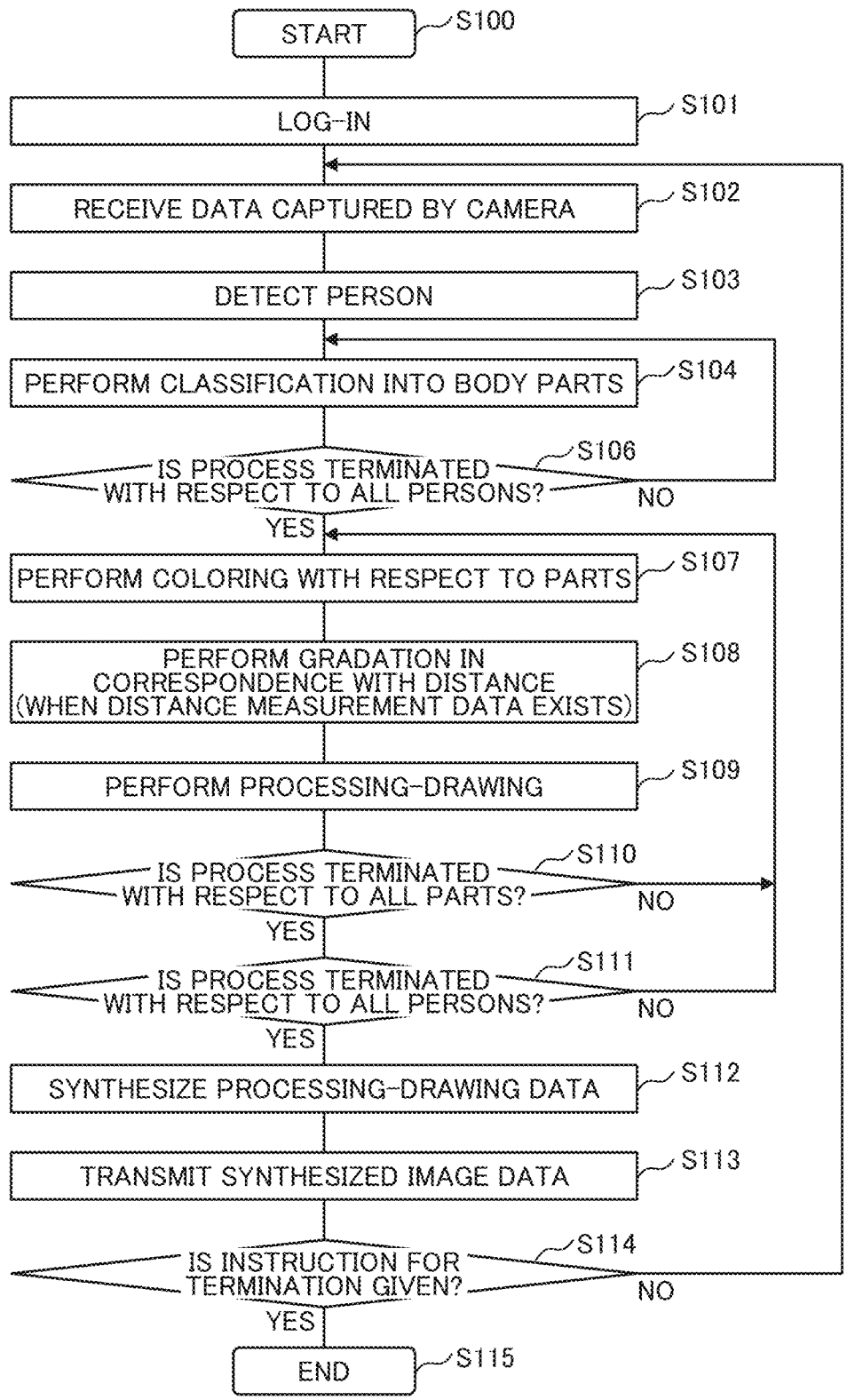
FIG. 5 is a view illustrating a flowchart of watching monitoring process.

FIG. 5 is a view illustrating a flowchart of the watching monitoring process. The following process is realized when the CPU 22 of the home server 2 executes the watching monitoring program 24b.

The process is initiated in S100, and the watching monitoring program is logged in in S101. Due to the log-in, the home server 2 and the monitoring camera 1 are linked. In S102, captured image data is received from the monitoring camera 1 through the network part 21. Note that, in a case of using the monitoring camera 1 illustrated in FIG. 2B, distance measurement data is received in combination with the captured image data.

In S103, a person is detected from the captured image data by the person detector 201. In addition, in S104, a region of the person detected by the person detector 201 is classified into body parts such as a face, a body, a hand, and a leg. In S106, determination is made as to whether or not classification of body parts has been terminated with respect to all detected persons. In a case where a non-processed person exists, the process returns to S104, and the above-described process is repeatedly executed.

In S107, different color data is applied to each of the body parts by the processing-drawing part 202. In addition, in S108, in a case where the distance measurement data is present in combination with the image data, gradation data is applied in correspondence with the distance measurement data. In S109, the processing-drawing process for the image data is performed in accordance with the applied color or the gradation data. In S110, determination is made as to whether or not the processing-drawing process has been terminated with respect to all body parts. In addition, in S111, determination is made as to whether or not the processing-drawing process has been terminated with respect to all persons. In a case where a non-processed body part or person exists, the process returns to S107, and the above-described process is repeatedly executed.

In S112, the image data subjected to the processing-drawing process is synthesized with the captured image data. In S113, the synthesized: image data is transmitted to the display terminal 8 by the network part 21 through the network 5.

In S114, in a case where an instruction for termination of the monitoring process is given by log-off or the like, the process is terminated in S115. In a case where the instruction for termination is not given, the process returns to S102, and the monitoring process continues.

As described above, the processing-drawing process of this example is not performed with respect to a face part of a person and is performed with respect to body parts other than the face part. With regard to watching monitoring, for example, in a case of watching a situation in which an old parent is at home, in a case of watching a situation of a kindergartener or a kindergarten teacher at a nursery school, or the like, a watched person is a person intended in advance for a watching person, and even when an image of a face part of the watched person is displayed as is, a privacy problem may not be posed.

On the other hand, in this example, the processing-drawing process is performed to hide a detailed situation of the body parts of the watched person, and for example, as in changing clothes or taking a bath, a situation in which a watched person dresses down is watched as is disappears. In addition, it is possible to suppress the watching person from viewing the privacy of the watched person, particularly, the old parent more than necessary. In addition, it is possible to prevent image data in which the whole body is captured from being leaked from the display terminal. According to this, the watched person can be watching-monitored without being conscious of the style of life and activity for privacy. In addition, in the processing-drawing process of this example, it is possible to display a processed image in the same format regardless of movement of the watched person, or the like.

As described above, according to Example 1, it is possible to grasp a situation of a watched person by a facial expression of the face or movement of body parts, and at the same time, it is possible to achieve privacy protection that obscures the lifestyle of the watched person. In addition, it is possible to provide a watching image in the same format regardless of a situation of the watched person, and thus even when the watching person initiates or tries to resume watching, there is an effect capable of instantly grasping the watching situation.

Example 2

In Example 2, description will be given of a case where a plurality of persons exist in a watching space, and each drawing process is performed by determining whether or not each person is a watched person.

Figure 6:
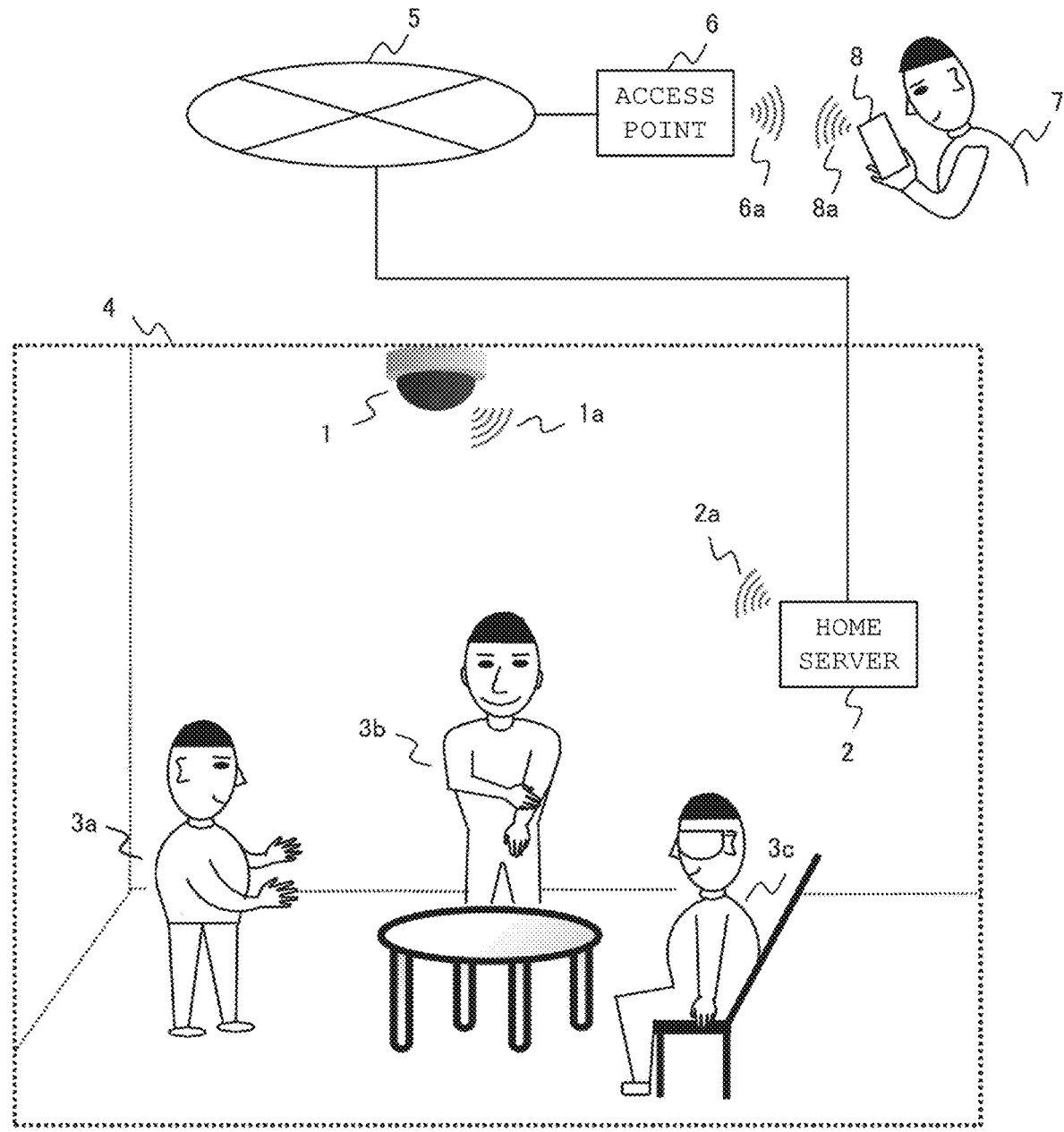
FIG. 6 is a view illustrating an overall configuration of a monitoring system relating to Example 2.

FIG. 6 is a view illustrating an overall configuration of a monitoring system relating to Example 2. An example in which a plurality of persons 3a to 3c exist in the watching space 4 will be described. The same reference numeral will be given to an element having the same function as the watching monitoring apparatus illustrated in Example 1 (FIG. 1), and redundant description will be omitted.

FIG. 7 is a block diagram illustrating a configuration example of the home server 2 in Example 2. When being compared with the configuration of the home server 2 of Example 1 (FIG. 3), the storage 24 includes face information registration data 24c in addition to the basic program 24a and the watching monitoring program 24b. The face information registration data 24c is data in which face information of a watched person who is a watching target is registered in advance.

The person detector 201 compares face information of a detected person with the registration data of the face information registration data 24c to determine whether or not a target person has been registered. In a case where the target person is a registered person (watched person), the processing-drawing process is performed by the processing-drawing part 202, and in a case where the target person is a non-registered person (other than the watched person), the processing-drawing process is not performed.

Figure 8:
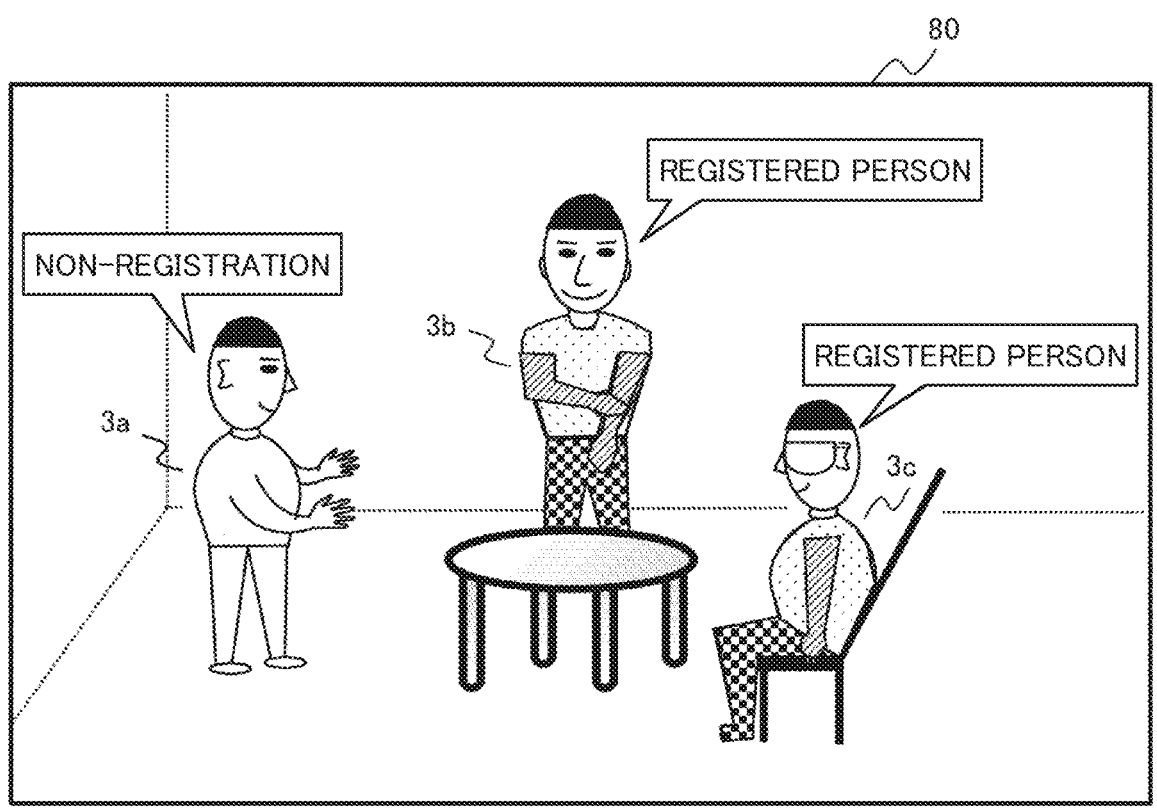
FIG. 8 is a view illustrating an example of a monitoring image displayed on a display terminal.

FIG. 8 is a view illustrating an example of a monitoring image 80 that is displayed on the display terminal 8. Here, description will be made on the assumption that a plurality of persons 3a to 3c are detected, the persons 3b and 3c are watched persons whose face information is registered in the face information registration data 24c, and face information of the person 3a is not registered in the face information registration data 24c and the perform is not a watched person.

With regard to the registered persons 3b and 3c, the processing-drawing part 202 has performed the coloring process with respect to body parts other than the face. On the other hand, with regard to the non-registered person 3a, the processing-drawing process is not performed with respect to the body parts.

Figure 9:
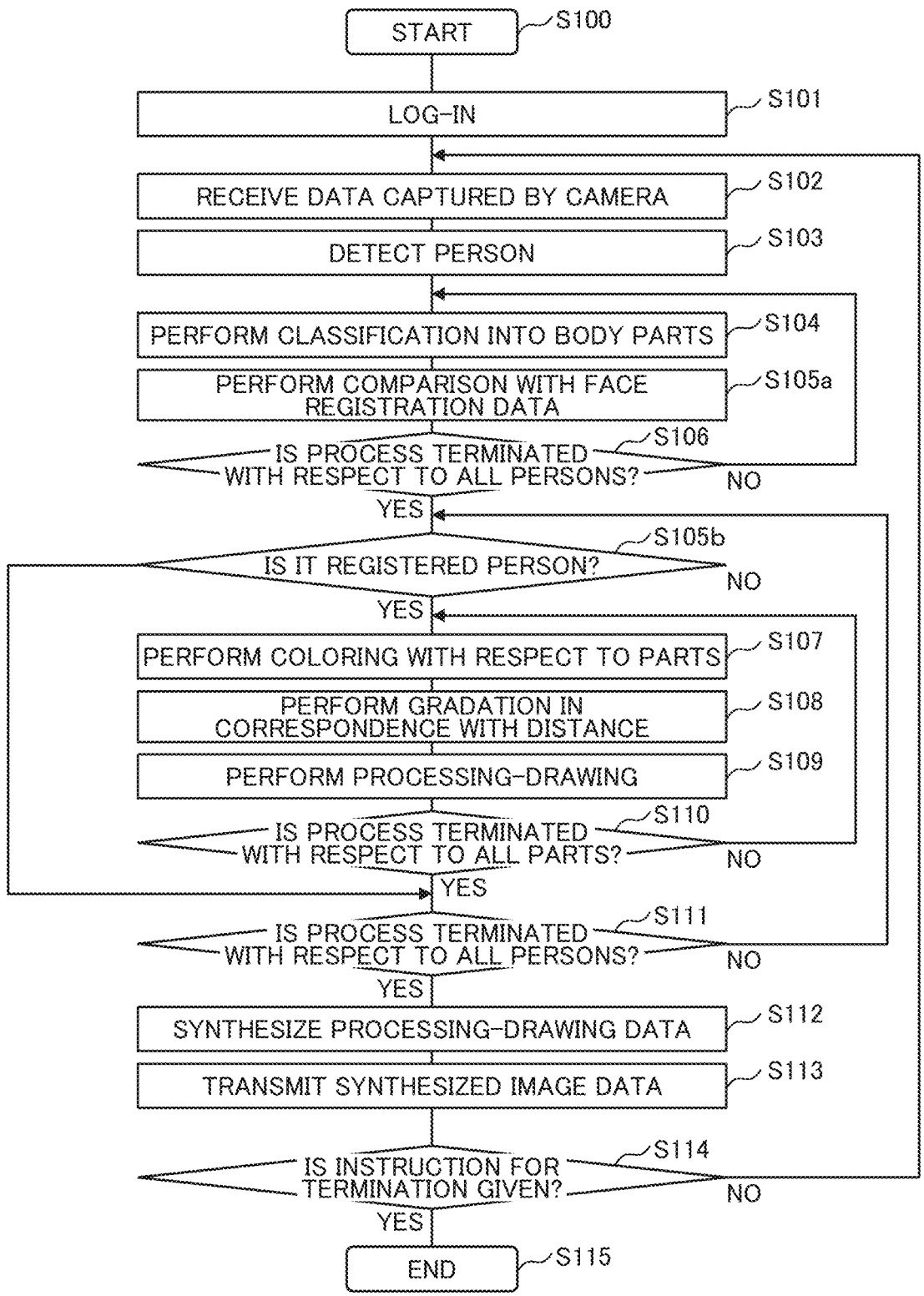
FIG. 9 is a view illustrating a flowchart of the watching monitoring process.

FIG. 9 is a view illustrating a flowchart of the watching monitoring process. The same reference numeral will be given to a step of performing the same process as in the process illustrated in Example 1 (FIG. 5), and redundant description will be omitted. In the flowchart in FIG. 9, S105a and S105b are added.

In S105a, the person detector 201 compares face information of a detected person with the registration data of the face information registration data 24c to determine whether or not a target person has been registered. In addition, in S105b, the process is branched depending on whether or not the target person is a watched person (registered), and the processing-drawing process subsequent to S107 is performed in a case of the watched person (S105b, Yes). In a case where the target person is not the watched person (S105b, No), the process proceeds to S111 without performing the processing-drawing process, and a process relating to next person progresses.

According to the above-described process flow, the processing-drawing process is performed with respect to only a person who has been registered as the watched person, and thus privacy of the watched person can be protected. With regard to persons other than the watched person, a captured image is displayed as is without performing the processing-drawing process, and thus a detailed situation can be grasped.

As described above, according to Example 2, the same effect as in Example 1 is provided, and the following effect is obtained simultaneously. Specifically, when a person other than the watched person exists in the watching space, the person is regarded as an unintended person, and this situation can be clearly and quickly grasped by the watching person.

Example 3

In Example 3, description will be given of a case where existence of a suspicious person in the watching space is detected and an alarm is issued. An overall configuration of the monitoring system is similar to Example 2 (FIG. 6).

Figure 10:
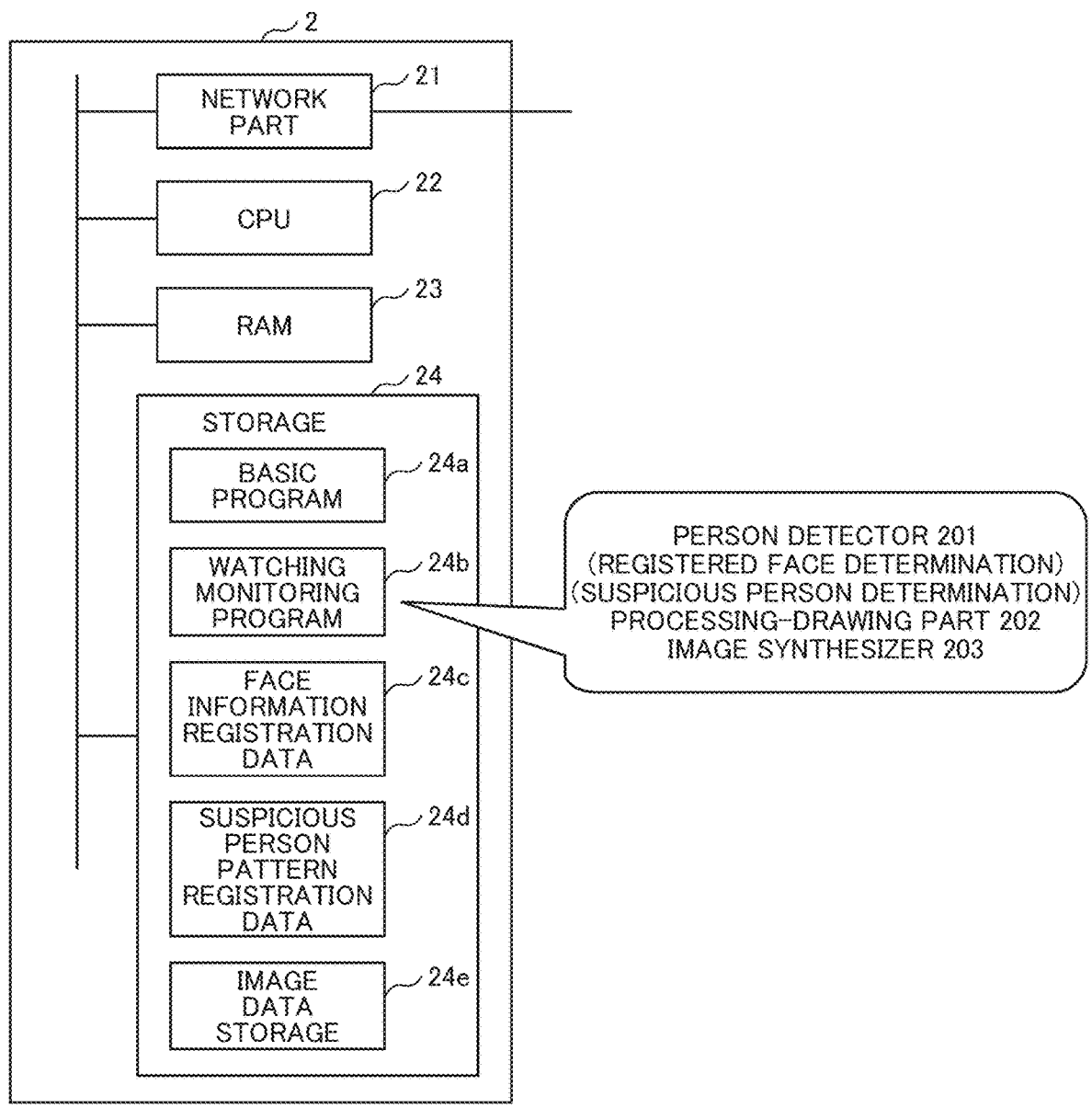
FIG. 10 is a block diagram illustrating a configuration example of a home server in Example 3.

FIG. 10 is a block diagram illustrating a configuration example of the home server 2 in Example 3. When being compared with the configuration of the home server 2 in Example 2 (FIG. 7), the storage 24 includes suspicious person pattern registration data 24d and an image data storage 24e in addition to the basic program 24a, the watching monitoring program 24b, and the face information registration data 24c.

The suspicious person pattern registration data 24d is data in which an external appearance situation in which a person intentionally hides a face is registered as a suspicious person pattern. For example, the suspicious person pattern includes a situation in which a person wears a full-face helmet, a balaclava, a mask, sunglasses, or the like. The image data storage 24e stores captured image data (before the processing-drawing process) transmitted from the monitoring camera.

The person detector 201 compares a detected person with the suspicious person pattern registration data 24d to determine whether or not the detected person corresponds to the suspicious person pattern. In a case where the detected person is determined as corresponding to the suspicious person pattern, alarm information is created, and the display terminal 8 is notified of the alarm information. In addition, in this case, the processing-drawing part 202 does not perform the processing-drawing process with respect to the captured image, and transmits the captured image data (before the processing-drawing process) that is stored in the image data storage 24e and is transmitted from the monitoring camera to the display terminal 8.

Figure 11:
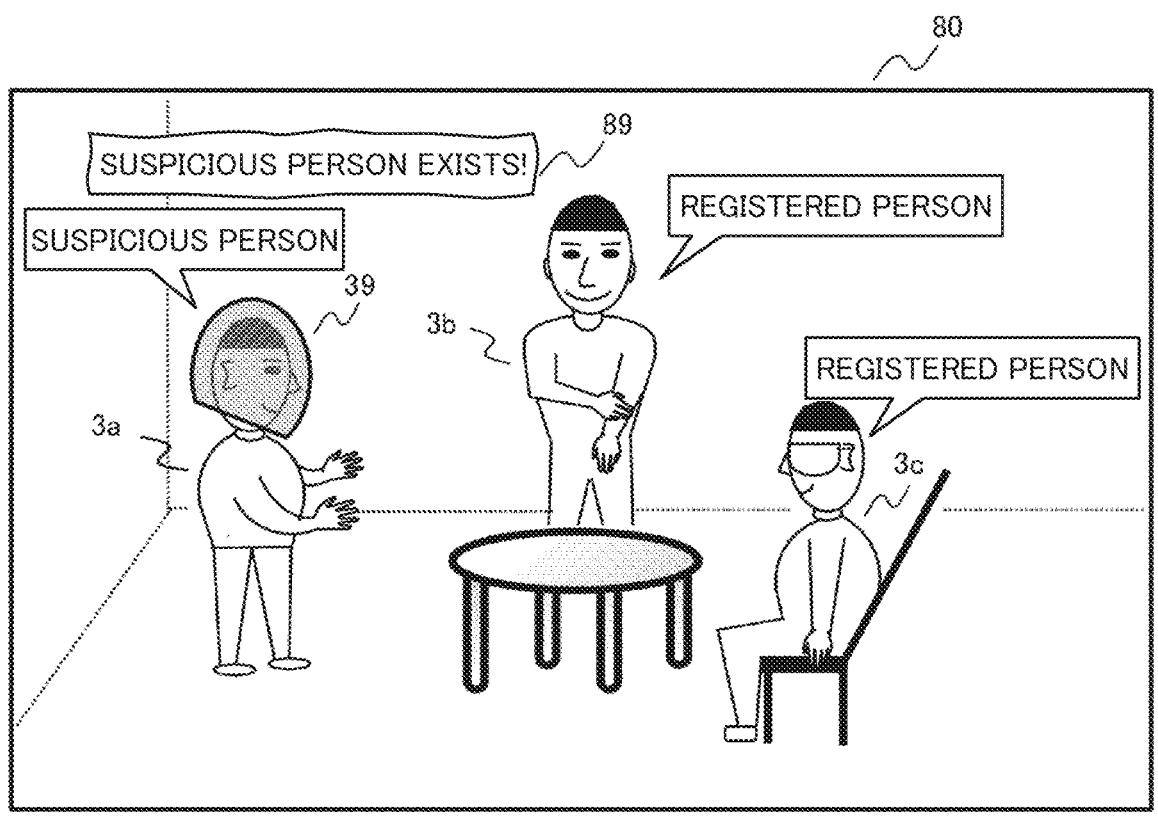
FIG. 11 is a view illustrating an example of a monitoring image displayed on the display terminal.

FIG. 11 is a view illustrating an example of a monitoring image 80 that is displayed on the display terminal 8. Here, a plurality of persons 3a to 3c are detected, and the persons 3b and 3c are watched persons whose face information is registered in the face information registration data 24c. On the other hand, description will be made on the assumption that face information of the person 3a is not registered in the face information registration data 24c, and the person 3a corresponds to a suspicious person pattern 39 (for example, wearing a helmet) registered in the suspicious person pattern registration data 24d.

When the person detector 201 detects the person 3a corresponding to the suspicious person pattern among the persons, alarm information 89 indicating "a suspicious person exists" or the like is created, and the alarm information 89 is transmitted to the display terminal 8 in a state of being included in the monitoring image 80 and is displayed on the display terminal 8. Alternatively, the alarm information may be transmitted to the display terminal 8 with a voice. In this case, with regard to the captured image, the processing-drawing part 202 does not perform the processing-drawing process with respect to not only the person 3a determined as a suspicious person but also the registered persons 3b and 3c. The reason for this is because a case where the suspicious person exists corresponds to an abnormal state, and thus it is necessary to notify the watching person 7 of a situation of each of the detected persons in a detailed manner.

Figure 12:
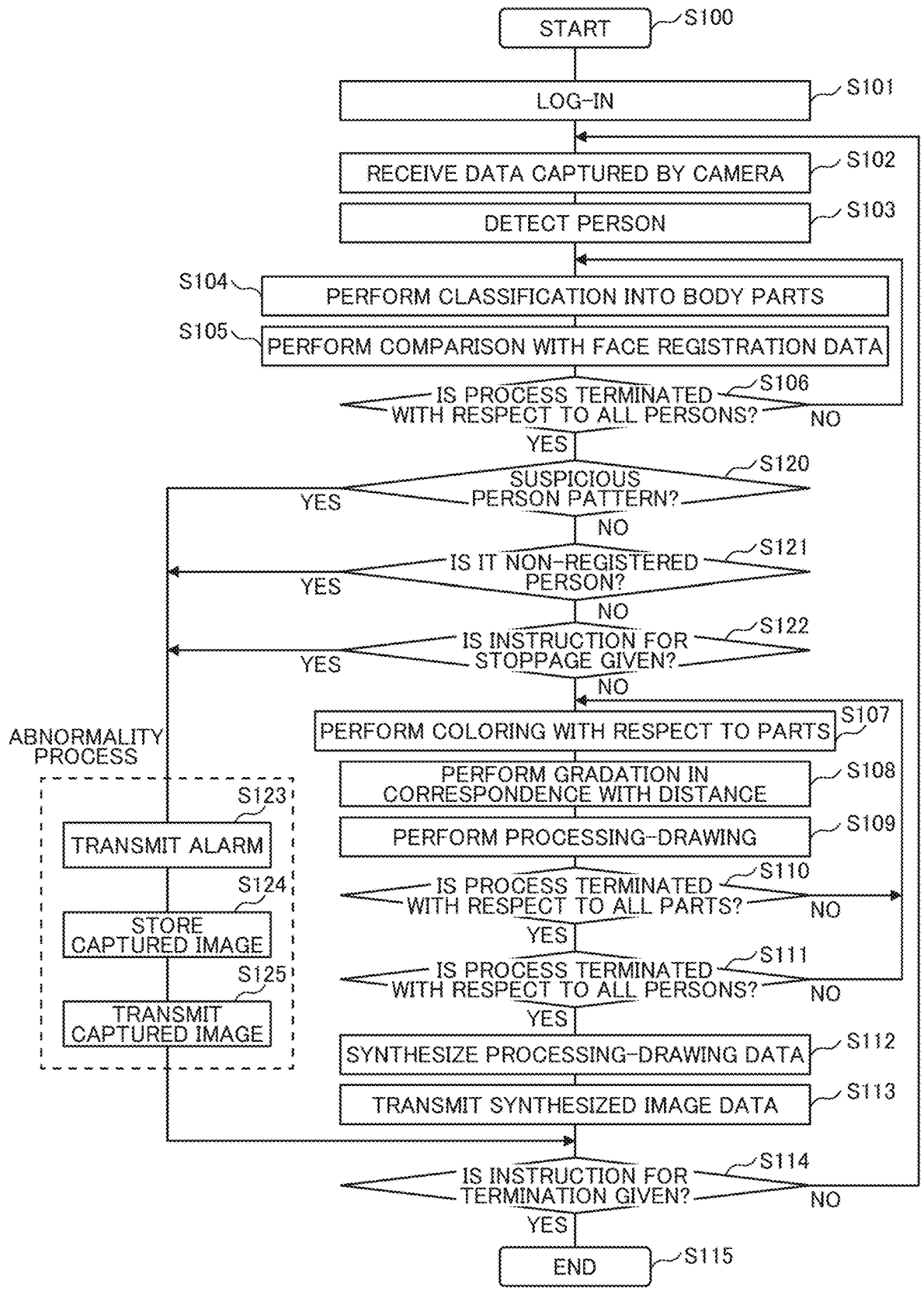
FIG. 12 is a view illustrating a flowchart of the watching monitoring process.

FIG. 12 is a view illustrating a flowchart of the watching monitoring process. The same reference numeral will be given to steps of performing the same process as in the process illustrated in Example 2 (FIG. 9), and redundant description will be omitted. In the flowchart in FIG. 12, an abnormality process of S123 to S125 is added.

In S120, the person detector 201 performs comparison with the suspicious person pattern registration data 24d, and when detecting a person corresponding to the suspicious person pattern, the process proceeds to the abnormality process subsequent to S123. In addition, in S121, when a person does not correspond to the suspicious person pattern but face information does not match the registration data of the face information registration data 24c, the person is regarded as an unintended person other than a watched person, and the process proceeds to the abnormality process subsequent to S123.

In addition, in S122, an instruction for stoppage of the processing-drawing process is given from a person (for example, the watching person) with higher system authority, the process is set to proceed to the abnormality process subsequent to S123. This corresponds to a case where the watching person makes a request for a detailed image.

In S123, the alarm information 89 is created and is transmitted to the display terminal 2. The alarm information 89 may also be transmitted with a voice or a mail in consideration of a case where the watching person 7 is not looking at the display terminal 8. In S124, the captured image is stored in the image data storage 24e. According to this, image data when abnormality occurs is analyzed, and can be used for specifying the suspicious person or the like. In S125, the captured image data stored in the image data storage 24e instead of the image data subjected to the processing-drawing process is transmitted as is to the display terminal 8.

Conditions for performing the above-described abnormality process (S123 to S125) are not limited to the above-described conditions. In a case where the number of watched persons such as an old person living alone is limited, when detecting persons more than the number of pieces of face information registered in the image data, the watching person may set the abnormality process to be instantly performed. For example, this corresponds to a case where three persons 3a to 3c are detected as in FIG. 11 in a situation in which face information of two persons including the persons 3b and 3c is registered in the face information registration data 24c.

In addition, when conditions for executing the above-described process are appropriately set by a person (watching person) with higher system authority, a user-friendly system is realized.

As described above, according to Example 3, there is an effect capable of instantly detecting an abnormal state in which a suspicious person exists in the watching space, and capable of notifying the watching person of the abnormal state.

Example 4

In Examples 1 to 3, description has been given on the assumption that the monitoring camera 1 and the home server 2 are separate members, but in Example 4, description will be given of a configuration in which the monitoring camera 1 and the home server 2 are integrated.

Figure 13B:
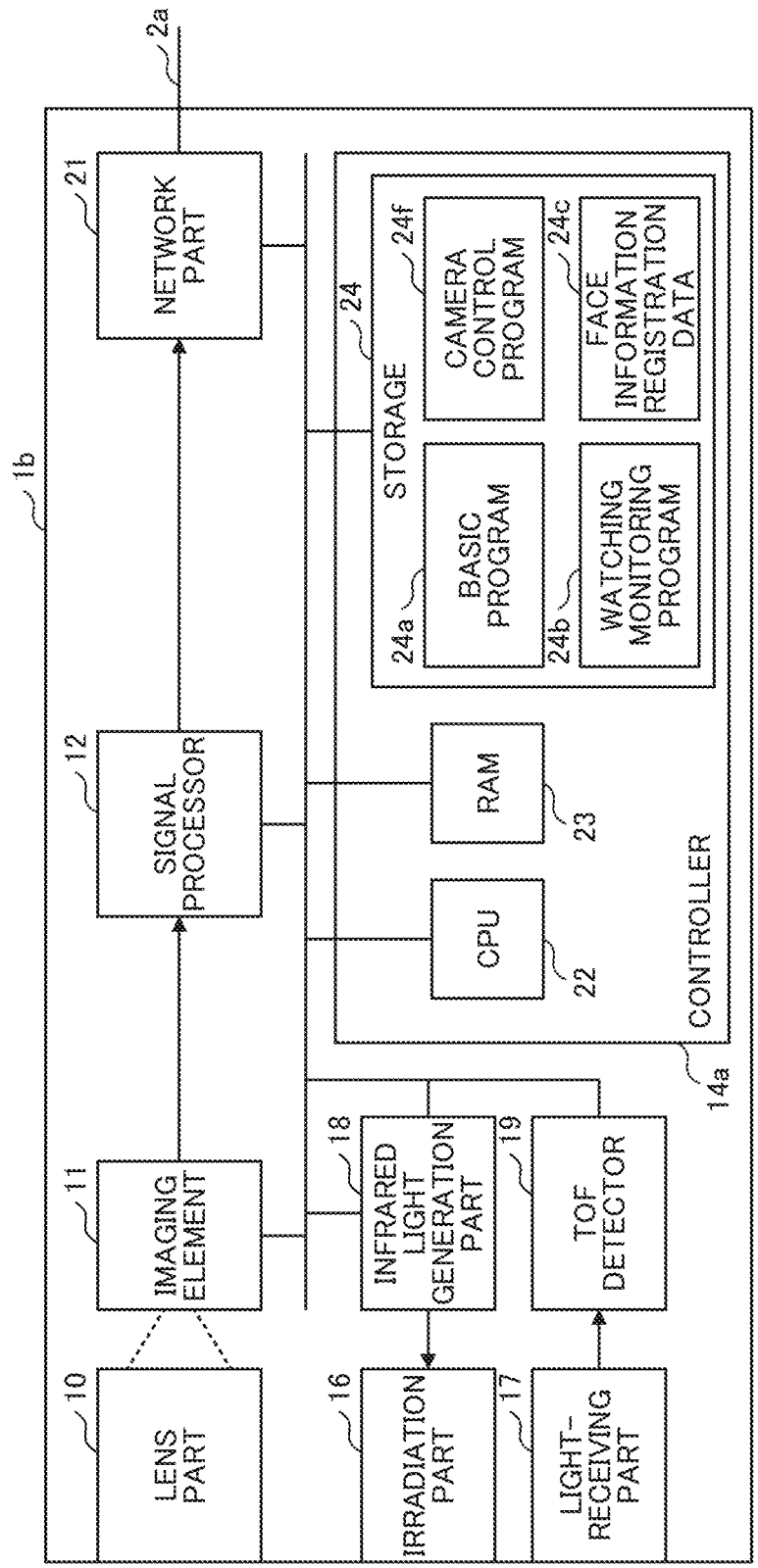
FIG. 13B is a block diagram illustrating a configuration example of a server-integrated monitoring camera (provided with a distance measuring function).

FIG. 13A and FIG. 13B are block diagram illustrating two configuration examples of a server-integrated monitoring camera. FIG. 13A illustrates a case where functions of the monitoring camera 1 in FIG. 2A and the home server 2 in Example 2 (FIG. 7) are integrated. FIG. 13B illustrates a case where functions of the monitoring camera 1 (provided with the distance measuring function) in FIG. 2B, and the home server 2 in Example 2 (FIG. 7) are integrated.

In a configuration of a server-integrated monitoring camera 1b, the home server 2 is referred to as a controller 14a, and a camera control program 24f that controls the monitoring camera 1 is added to the storage 24. In addition, the network part 21 transmits synthesized image data of the image subjected to the processing-drawing process to the external network 5, but direct transmission to a network may be performed. In addition, an access point may be disposed in the watching space 4 and transmission through the access point may be performed. It is needless to say that the controller 14a in the server-integrated monitoring camera 1b may employ a configuration of another example (FIG. 3 or FIG. 10).

According to Example 4, since the monitoring camera 1 and the home server 2 are integrated with each other, there is an effect of realizing a reduction in a total size of the monitoring apparatus, and easy installation of the apparatus.

Example 5

In Example 5, description will be given of a configuration in which a common processing-drawing process is performed to the same person in a case where a plurality of monitoring cameras are provided to display a plurality of monitoring images.

Figure 14:
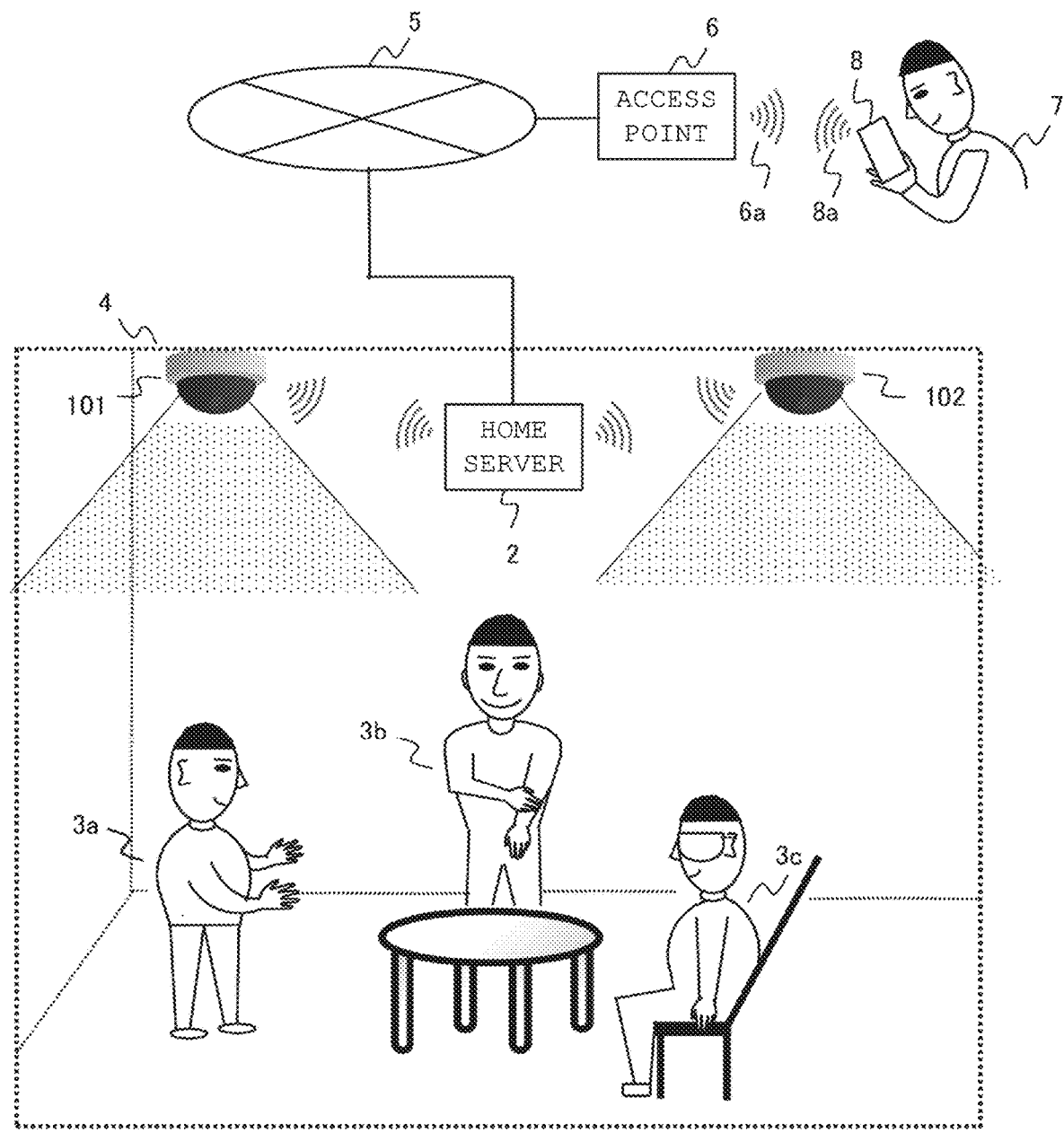
FIG. 14 is a view illustrating an overall configuration of a monitoring system relating to Example 5.

FIG. 14 is a view illustrating an overall configuration of a monitoring system relating to Example 5. A plurality of (here, two) monitoring cameras 101 and 102 are provided in the watching space 4. The monitoring cameras 101 and 102 have the same configuration as in the monitoring camera 1 illustrated in FIG. 2A or FIG. 2B, and are connected to a common home server 2. Here, the home server 2 illustrated in Example 2 (FIG. 7) is applied. The home server 2 performs a processing-drawing process with respect to an image captured by each of the monitoring cameras 101 and 102. In addition, the images of the monitoring cameras 101 and 102 are switched and are transmitted to the display terminal 8 in response to a request from the watching person 7. When using the plurality of monitoring cameras, even in a case where the watching space 4 is wide, the entirety of the watching space 4 can be monitored by dividing regions thereof.

Figure 15A:
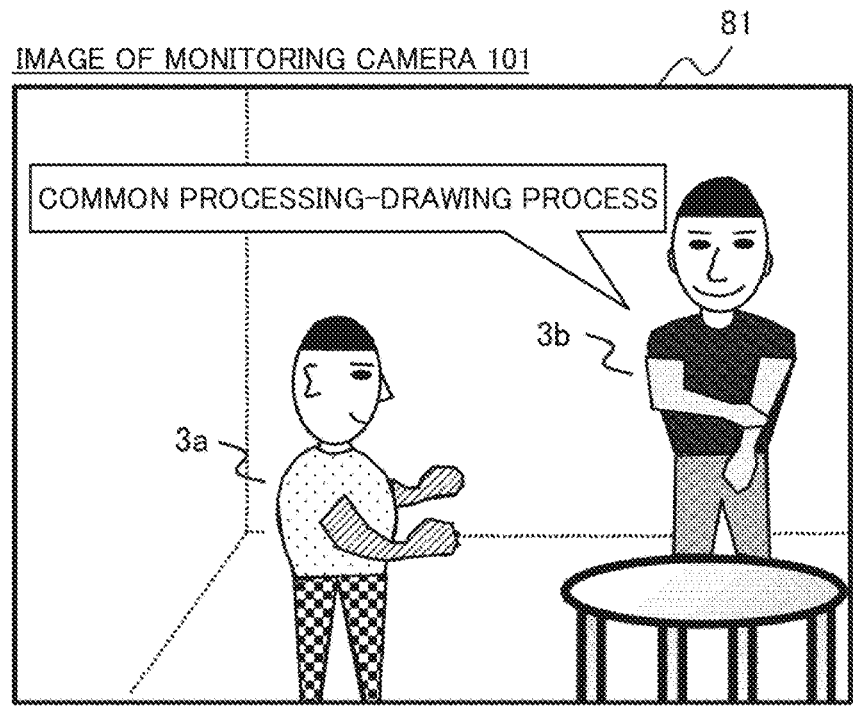
FIG. 15A is a view illustrating an example of a monitoring image (monitoring camera 101) that is displayed.
Figure 15B:
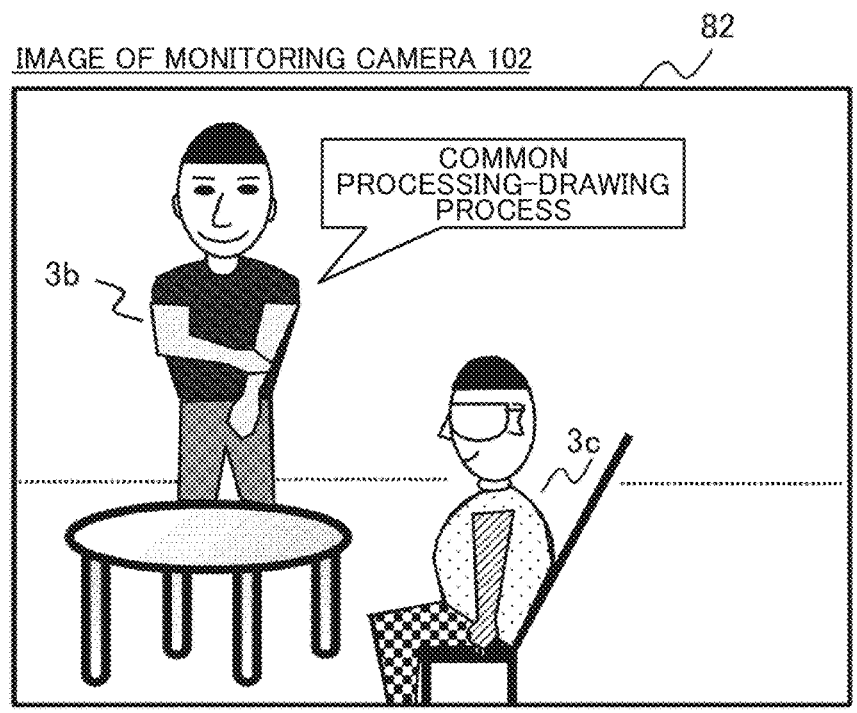
FIG. 15B is a view illustrating an example of a monitoring image (monitoring camera 102) that is displayed.

FIG. 15A and FIG. 15B are views illustrating an example of a monitoring image that is displayed on the display terminal 8. FIG. 15A illustrates a monitoring image 81 transmitted from the monitoring camera 101, and FIG. 15B illustrates a monitoring image 82 transmitted from the monitoring camera 102. With regard to monitoring regions of the monitoring cameras 101 and 102, partial regions of the watching space 4 overlap each other, and thus the same person may appear in both the monitoring images 81 and 82. In this example, a person 3b is included in both the monitoring images 81 and 82. In this case, with respect to the same person 3b, the processing-drawing part 202 sets the processing-drawing processing to be common between the two monitoring images, and performs the same coloring process and the same gradation process. On the other hand, a different processing-drawing process is performed with respect to different persons 3*a* and 3*c*. According to this, when switching selection of the monitoring cameras 101 and 102, since the same processing-drawing process has been performed with respect to the same person, the watching person can instantly recognize the same person, and thus even when the monitoring space is divided, the divided monitoring spaces can be recognized in an integrated and easy manner.

Figure 16:
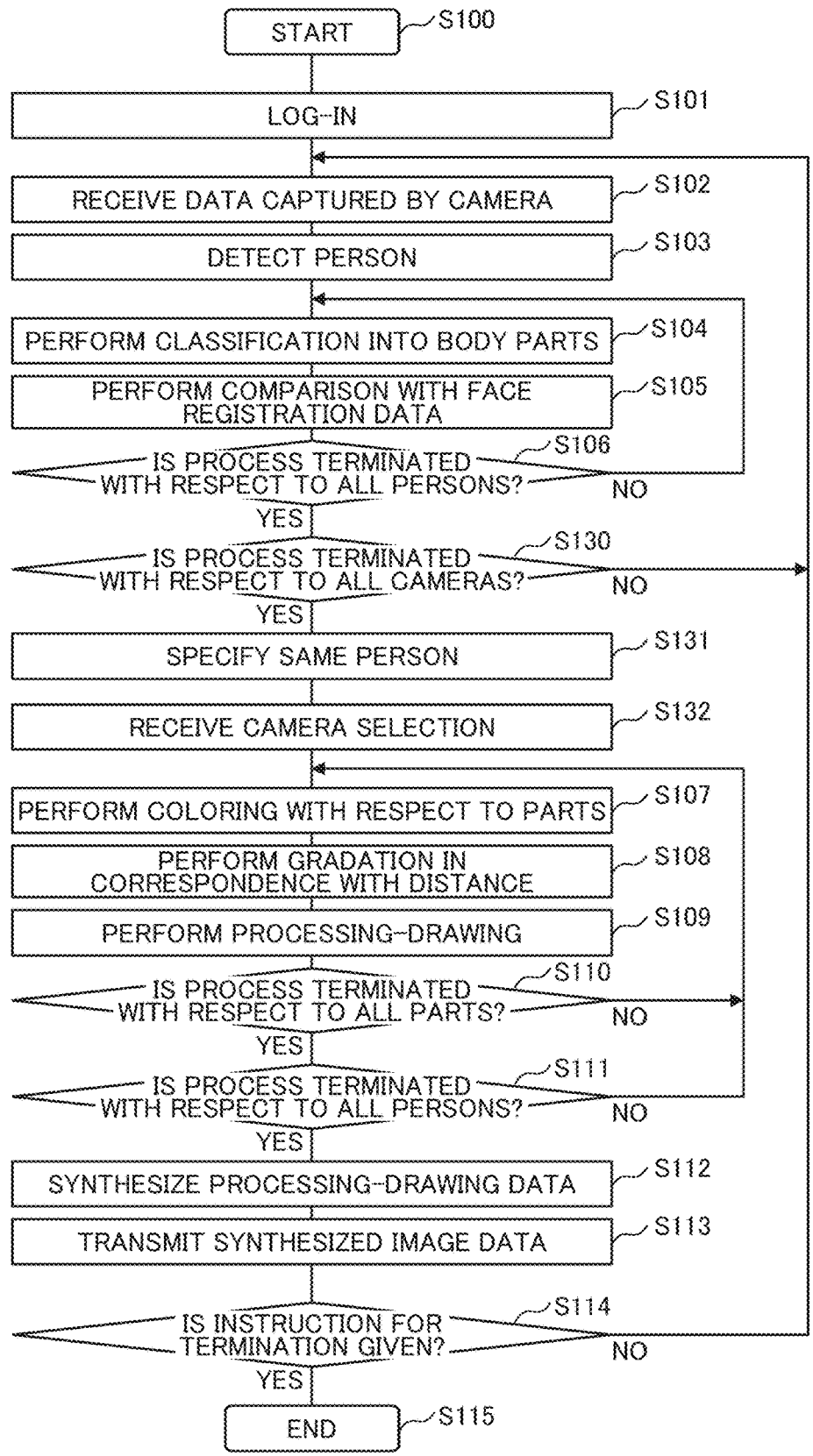
FIG. 16 is a view illustrating a flowchart of the watching monitoring process.

FIG. 16 is a view illustrating a flowchart of a watching monitoring process. The same reference numeral is given to a step of performing the same process as the process illustrated in Example 2 (FIG. 9).

In the flowchart in FIG. 16, step S130 is added, and a person detection process in S102 to S106 is repeated in correspondence with a plurality of monitoring cameras by the number of the monitoring camera.

In S131, the person detector 201 specifies the same person photographed by the plurality of monitoring cameras. In S132, selection information of a monitoring camera from which a monitoring image is to be transmitted is received from the display terminal 8 side. After S107, the processing-drawing process is performed with respect to an image captured by a selected monitoring camera, but common processing-drawing is performed with respect to a person who is specified as the same person in S131. Note that, with respect to a non-registered person in face data comparison in S105, the processing-drawing is not performed as in the case of Example 2. In S113, a monitoring image of the selected monitoring camera is transmitted to the display terminal 8.

As described above, according to Example 5, in a watching monitoring apparatus provided with a plurality of monitoring cameras, since monitoring is performed while switching the monitoring cameras, there is an effect capable of grasping divided watching spaces as a continuous space, and capable of easily identifying the same watched person between a plurality of monitoring images.

Example 6

In Example 6, description will be given of a configuration in which a server that is a management apparatus of a monitoring system is disposed on a network.

Figure 17:
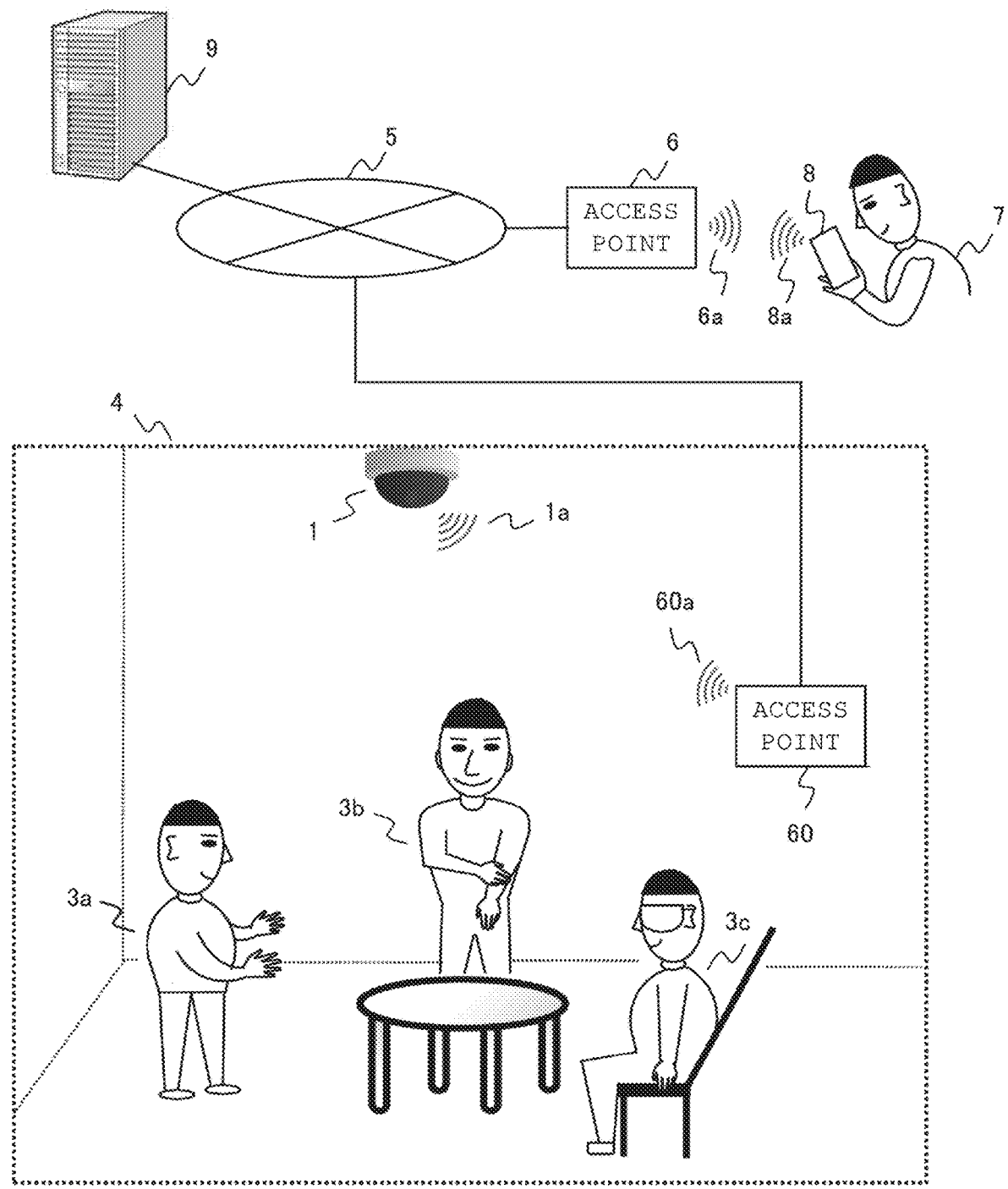
FIG. 17 is a view illustrating an overall configuration of a monitoring system relating to Example 6.

FIG. 17 is a view illustrating an overall configuration of a monitoring system relating to Example 6. The monitoring system of this example has a configuration in which the function of the home server 2 in Example 1 (FIG. 1) or Example 2 (FIG. 6) is realized by a server 9 disposed on a network 5. This configuration is an aspect suitable for providing watching monitoring as a commercial service through a network.

As a new configuration, the server 9 that is a management apparatus disposed on the network 5, and an access point 60 that relays an image captured by the monitoring camera 1 are added.

The access point 60 transmits image data captured by the monitoring camera 1 to the server 9 through a communication signal 60*a* and the network 5. In the server 9, the processing-drawing process is performed with respect to the image captured by the monitoring camera 1, and the resultant image is transmitted to the display terminal 8 through the access point 6.

Figure 18:
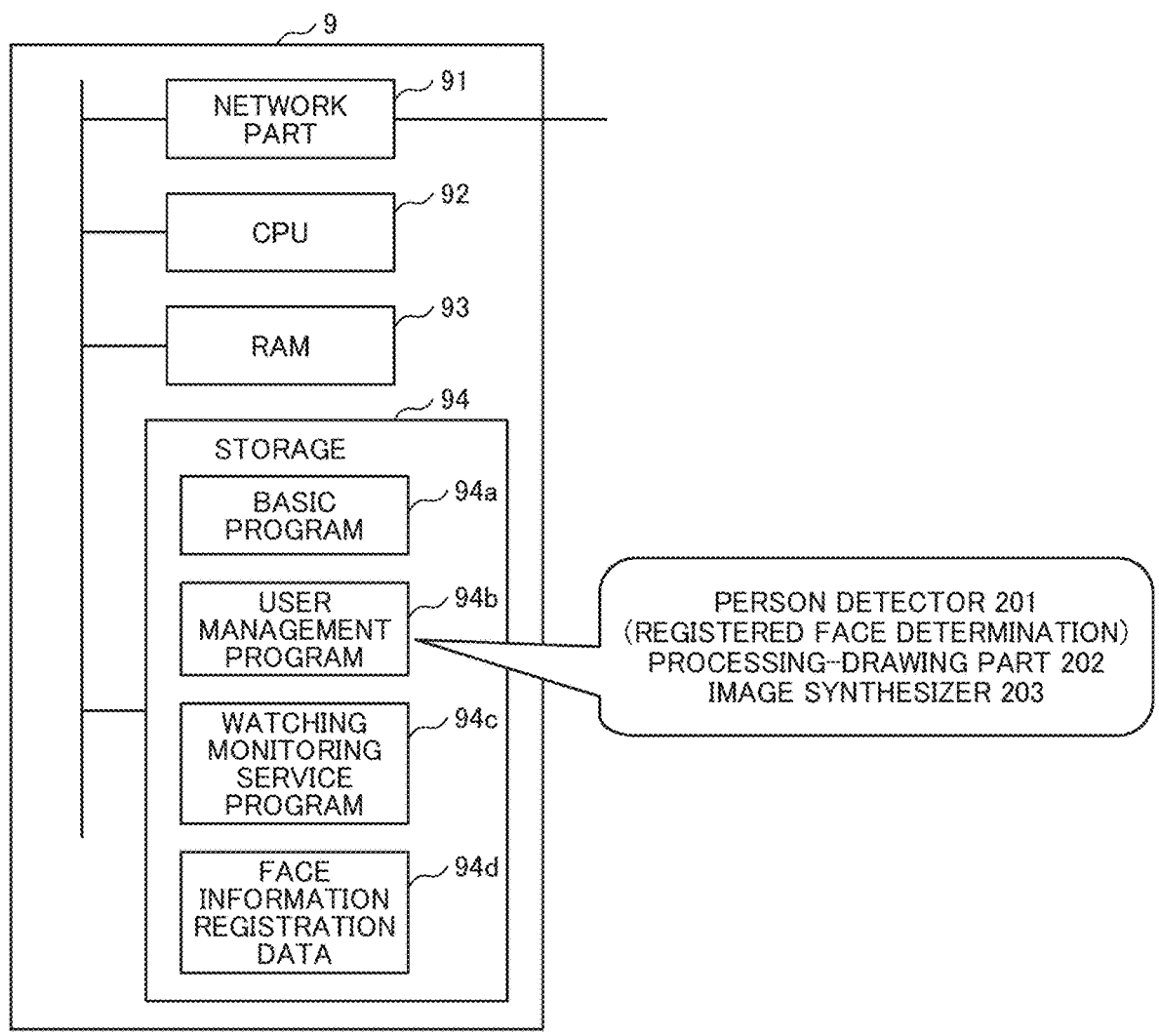
FIG. 18 is a block diagram illustrating a configuration example of the server.

FIG. 18 is a block diagram illustrating a configuration example of the server 9 in Example 6. The configuration of Example 2 (FIG. 7) is applied as a basic configuration, and a network part 91, a CPU 92, a RAM 93, and a storage 94 are provided. The storage 94 includes a basic program 94*a*, a user management program 94*b*, a watching monitoring service program 94*c*, and face information registration data 94*d* as a processing program or data. Here, the user management program 94*b* manages a user to whom a watching monitoring service is provided. The watching space 4 in FIG. 17 is a space of a specific user to whom the service is provided. Face data of a watched person for every user is registered in the face information registration data 94*d* in advance. In addition, the processing program or data is stored in the RAM 93, and is executed by the CPU 92. A configuration method of the storage 94 is not limited, and the storage 94 may be configured by a semiconductor such as a flash ROM, a combination with a hard disk, or the like.

Figure 19:
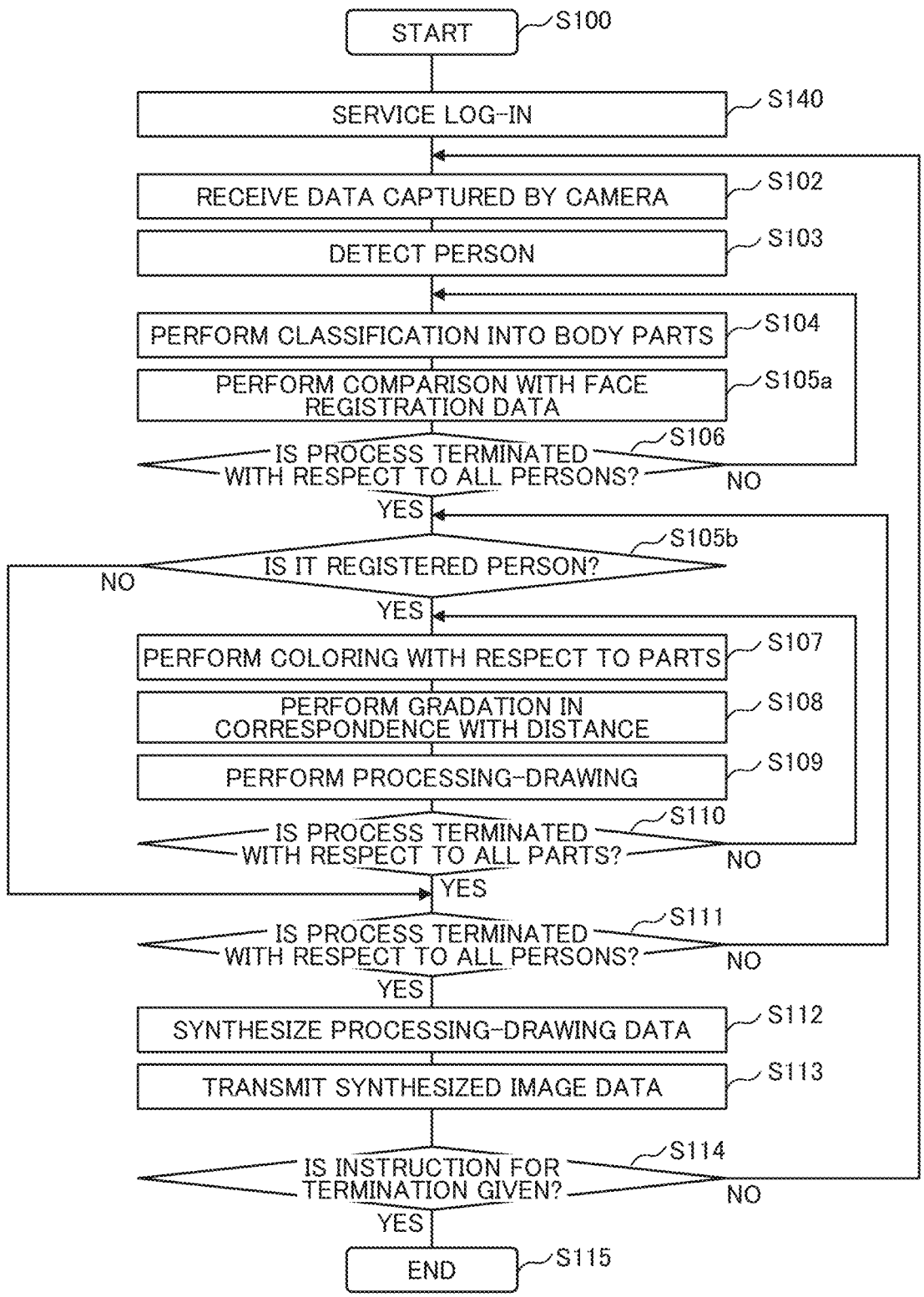
FIG. 19 is a view illustrating a flowchart of the watching monitoring process.

FIG. 19 is a view illustrating a flowchart of a watching monitoring process. The following process is executed by the watching monitoring service program 94*c*. The same reference numeral is given to a step of performing the same process as the process illustrated in Example 2 (FIG. 9).

The process is initiated in S100, and log-in to a watching monitoring service is performed in S140. Due to the log-in, the server 9 and the monitoring camera 1 of a user are linked.

Image data transmitted from the monitoring camera is received in S102. The subsequent steps are similar as in the process flow in FIG. 9.

As described above, according to Example 6, there is an effect capable of being applied to a commercial watching monitoring service corresponding to a plurality of users.

Note that, in the respective examples, the communication signals 1*a*, 2*a*, 6*a*, 8*a*, and the like are illustrated as an image of a wireless signal, but the communication signals may be a wired signal, and even when using an image compression/decompression technology such as H.264 to reduce the amount of data in a communication part, the object and the effect of the invention are not damaged.

There is no limitation to the above-described examples, and a part of a configuration of an arbitrary example can be substituted with another example. In addition, a configuration of another example can also be added to a configuration of an arbitrary example. These modifications pertain to the scope of the invention, and numerical values, messages, and the like in the specifications or the drawings are illustrative only, and even when using other numerical values or messages, the effect of the invention is not damaged.

In addition, some or the entirety of the functional blocks and the like described in the examples can be implemented in hardware, for example, by designing the functional blocks as integrated circuits. In addition, the functional blocks and the like can be implemented in software by analyzing and executing an operation program by a microprocessor, a CPU, or the like. In addition, an implementation range of software is not limited, and hardware and software can be used in combination.

REFERENCE SIGNS LIST

1, 1*b*, 101, 102 Monitoring camera
2 Home server
3, 3*a* to 3*c*, 30 Person (watched person)
4 Watching space
5 Network
6, 60 Access point
7 Watching person
8 Display terminal
9 Server
21 Network part
22 CPU 23 RAM
24, 94 Storage
24b Watching monitoring program
94c Watching monitoring service program
24c, 94d Face information registration data
24d Suspicious person pattern registration data
24e Image data storage
24f Camera control program
31 Face
32 to 34 Body part
39 Suspicious person pattern
80, 81, 82 Monitoring image
201 Person detector
202 Processing-drawing part
203 Image synthesizer

The invention claimed is:

1. A watching monitoring apparatus, comprising:
a monitoring camera configured to image a watching space in which a watched person exists;
a person detector configured to detect a person from a captured image acquired by the monitoring camera, and to classify the detected person into a face part and a body part;
a processing-drawing part configured to perform a processing-drawing process with respect to the body part except for the face part classified by the person detector;
an image synthesizer configured to create a synthesized image of an image subjected to the processing-drawing process and the captured image;
a network part configured to transmit the synthesized image to a display terminal of a watching person; and
storage configured to store face information registration data in which face information of the watched person is registered,
wherein the person detector compares face information of the detected person and registration data that is the face information registration data with each other to determine whether the detected person has been registered,
wherein, in response to the person detector determining that the detected person has been registered, the processing-drawing part is configured to perform the processing-drawing process with respect to the detected person, and in response to determining that the detected person has not been registered, the processing-drawing part is configured not to perform the processing-drawing process with respect to the detected person,
wherein the person detector is further configured to:
simultaneously detects multiple people in the watching space where the multiple people exist; and
compare face information of the detected multiple people with the face information registration data to determine whether the detected multiple people are registered,
wherein, in response to determining that the detected person has been registered among the detected multiple people, the processing-drawing part is configured to perform the processing-drawing process with respect to the detected person, and
wherein, in response to determining that the detected person has not been registered among the detected multiple people, the processing-drawing part is configured not to perform the processing-drawing process with respect to the detected person.

2. The watching monitoring apparatus according to claim 1,
wherein a process of creating alarm information and transmitting the alarm information to the display terminal, or a process of transmitting the captured image obtained by the monitoring camera to the display terminal without performing the processing-drawing process is performed as an abnormality process of the watching monitoring.

3. The watching monitoring apparatus according to claim 2,
wherein the storage is further configured to store suspicious person pattern registration data in which an external appearance situation of a suspicious person is registered as a suspicious person pattern, and
wherein the person detector is further configured to compare the detected person with the suspicious person pattern registration data, and execute the abnormality process in a case where the detected person is determined as corresponding to the suspicious person pattern.

4. The watching monitoring apparatus according to claim 2,
wherein in a case where the detected person is determined as an unintended person other than the watched person or in a case where a number of persons detected by the person detector is larger than a number of persons registered as the watched person, the person detector is configured to perform the abnormality process.

5. The watching monitoring apparatus according to claim 1,
wherein a plurality of the monitoring cameras are provided to acquire a plurality of captured images, and
wherein, in a case where the person detector determines that the same person is included in the plurality of captured images, the processing-drawing part is configured to perform a processing-drawing process common to the plurality of captured images with respect to the same person.

6. The watching monitoring apparatus according to claim 1, wherein the processing-drawing part is configured to perform a coloring process with respect to the body part except for the face part.

7. The watching monitoring apparatus according to claim 6,
wherein the monitoring camera further has a function of measuring a distance up to an imaging target, and
wherein the processing-drawing part is configured to perform a gradation process with respect to the body part except for the face part in correspondence with distance measurement data acquired by the monitoring camera.

8. The watching monitoring apparatus according to claim 1,
wherein the monitoring camera further has a function of measuring a distance up to an imaging target, and
wherein the processing-drawing part is configured to perform a gradation process with respect to the body part except for the face part in correspondence with distance measurement data acquired by the monitoring camera.

9. A watching monitoring apparatus configured to perform watching by a management apparatus arranged on a network on an outer side of a watching space,
wherein the management apparatus includes:
a network part configured to receive a captured image from a monitoring camera configured to image the watching space in which a watched person exists;

storage configured to store face information registration data in which face information of the watched person is registered;

a person detector configured to detect a person from a captured image acquired by the monitoring camera, and to classify the detected person into a face part and a body part;

a processing-drawing part configured to perform a processing-drawing process with respect to the body part except for the face part classified by the person detector; and an image synthesizer configured to create a synthesized image of an image subjected to the processing-drawing process and the captured image, wherein the management apparatus transmits the synthesized image to a display terminal of a watching person through the network part, wherein the person detector compares face information of the detected person and registration data that is the face information registration data with each other to determine whether or not the detected person has been registered, wherein, in response to the person detector determining that the detected person has been registered, the processing-drawing part is configured to perform the processing-drawing process with respect to the detected person, and in response to the person detector determining that the detected person has not been registered, the processing-drawing part is configured not to perform the processing-drawing process with respect to the detected person, wherein the person detector is further configured to:
simultaneously detects multiple people in the watching space where the multiple people exist; and
compare face information of the detected multiple people with the face information registration data to determine whether the detected multiple people are registered, wherein, in response to determining that the detected person has been registered among the detected multiple people, the processing-drawing part is configured to perform the processing-drawing process with respect to the detected person, and wherein, in response to determining that the detected person has not been registered among the detected multiple people, the processing-drawing part is configured not to perform the processing-drawing process with respect to the detected person.

10. The watching monitoring apparatus according to claim 9, wherein the processing-drawing part is configured to perform a coloring process with respect to the body part except for the face part.

11. A watching monitoring method, comprising:
acquiring a captured image of a watching space in which a watched person exists;
detecting a person from the captured image and classifying the detected person into a face part and a body part;
performing a processing-drawing process with respect to the body part except for the face part;
creating a synthesized image of an image subjected to the processing-drawing process and the captured image; and
transmitting the synthesized image to a display terminal of a watching person,
registering face information of the watched person in face information registration data in advance, wherein the detecting the person further includes comparing the face information of the detected person with the face information registration data, and determining whether the detected person has been registered, wherein, in response to determining that the detected person has been registered, the processing-drawing process is performed with respect to the detected person, and in response to determining that the detected person has not been registered, the processing-drawing process is not performed with respect to the detected person, wherein the detecting the person further includes:
simultaneously detecting multiple people in a watching space where the multiple people exist; and
comparing face information of the detected multiple people with the face information registration data to determine whether or not the detected multiple people are registered, wherein, in response to determining that the detected person has been registered among the detected multiple people, the processing-drawing process is performed with respect to the detected person, and wherein, in response to determining that the detected person has not been registered among the detected multiple people, the processing-drawing process is not performed with respect to the detected person.

12. The watching monitoring method according to claim 11, further comprising:
registering an external appearance situation of a suspicious person in suspicious person pattern registration data in advance as a suspicious person pattern; and
performing a process of creating alarm information and transmitting the alarm information to the display terminal, or a process of transmitting the captured image to the display terminal without performing the processing-drawing process, wherein the detecting the person further includes comparing the detected person with the suspicious person pattern registration data, and wherein, in a case where the detected person is determined as corresponding to a suspicious person pattern, the process of creating alarm information and transmitting the alarm information to the display terminal, or the process of transmitting the captured image to the display terminal, is performed.

13. The watching monitoring method according to claim 11,
wherein the acquiring the captured image further includes acquiring a plurality of captured images with respect to the watching space, and
wherein, in a case where the same person is determined as being included in the plurality of captured images, the processing-drawing process common to the plurality of captured images is performed with respect to the same person.

14. The watching monitoring method according to claim 13,
wherein the performing the processing-drawing process further includes performing any of a coloring process with respect to the body part except for the face part, and a gradation process with respect to the body part in correspondence with distance measurement data up to an imaging target, or both of the processes.

15. The watching monitoring method according to claim 11,
wherein the performing the processing-drawing process further includes performing any of a coloring process with respect to the body part except for the face part, and a gradation process with respect to the body part in correspondence with distance measurement data up to an imaging target, or both of the processes.

* * * * *